United States Patent
Han et al.

(10) Patent No.: US 11,202,199 B2
(45) Date of Patent: Dec. 14, 2021

(54) ELECTRONIC DEVICE USING BLUETOOTH COMMUNICATION AND METHOD OF OPERATING SAME

(71) Applicant: Samsung Electronics Co., Ltd., Suwon-si (KR)

(72) Inventors: Euibum Han, Suwon-si (KR); Gupil Cheong, Suwon-si (KR); Gibeom Kim, Suwon-si (KR); Hyunah Oh, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/660,020

(22) Filed: Oct. 22, 2019

(65) Prior Publication Data

US 2020/0128394 A1    Apr. 23, 2020

(30) Foreign Application Priority Data

Oct. 22, 2018 (KR) .......................... 10-2018-0126330

(51) Int. Cl.
*H04W 8/28* (2009.01)
*H04W 76/14* (2018.01)
(Continued)

(52) U.S. Cl.
CPC .............. *H04W 8/28* (2013.01); *H04W 4/08* (2013.01); *H04W 4/80* (2018.02); *H04W 8/005* (2013.01);
(Continued)

(58) Field of Classification Search
CPC combination set(s) only.
See application file for complete search history.

(56) References Cited

U.S. PATENT DOCUMENTS

2002/0175819 A1* 11/2002 Joo ..................... G08B 25/007
340/573.1
2007/0274271 A1* 11/2007 Jones .................... H04W 8/005
370/338
(Continued)

FOREIGN PATENT DOCUMENTS

EP          2816865 A1   12/2014
EP          2925038 A1    9/2015
KR   10-2017-0140363 A   12/2017

OTHER PUBLICATIONS

European Search Report in connection with European Application No. 19204595.3 dated Feb. 5, 2020, 10 pages.

*Primary Examiner* — Junpeng Chen

(57) ABSTRACT

An electronic device includes a display; a first wireless communication circuit configured to support Bluetooth (BT) communication and to include a first BT address; a processor operatively connected to the display and the first wireless communication circuit; and a memory, wherein the memory may store instructions that are configured to, when executed, cause the processor to: receive first data including a second BT address associated with a first external device; perform a page scan based on the first BT address and the second BT address using the BT communication; receive second data based on the second BT address from a second external device using the BT communication; identify information for connection with the second external device based on the second data using the BT communication; and provide a user interface for connection with the second external device through the display based on the identified information.

20 Claims, 22 Drawing Sheets

(51) Int. Cl.
  *H04W 4/80*   (2018.01)
  *H04W 4/08*   (2009.01)
  *H04W 8/00*   (2009.01)
  *H04W 56/00*  (2009.01)
  *H04B 1/713*  (2011.01)
  *H04W 84/18*  (2009.01)

(52) U.S. Cl.
  CPC ....... *H04W 56/0015* (2013.01); *H04W 76/14* (2018.02); *H04B 1/713* (2013.01); *H04W 84/18* (2013.01)

(56) References Cited

U.S. PATENT DOCUMENTS

| | | | |
|---|---|---|---|
| 2014/0308898 A1* | 10/2014 | Lee | H04W 12/003 455/41.3 |
| 2015/0271432 A1* | 9/2015 | Muth | H04L 12/2809 348/552 |
| 2016/0157078 A1* | 6/2016 | Palin | H04W 4/80 455/41.2 |
| 2016/0278151 A1* | 9/2016 | Kwon | H04W 76/14 |
| 2016/0360341 A1 | 12/2016 | Srivatsa et al. | |
| 2017/0208639 A1* | 7/2017 | Lee | H04W 72/0406 |

\* cited by examiner

ELECTRONIC DEVICE USING BLUETOOTH COMMUNICATION AND METHOD OF OPERATING SAME

CROSS-REFERENCE TO RELATED APPLICATION

This application is based on and claims priority under 35 U.S.C. 119 to Korean Patent Application No. 10-2018-0126330, filed on Oct. 22, 2018, in the Korean Intellectual Property Office, the disclosure of which is herein incorporated by reference in its entirety.

BACKGROUND

1. Field

Various embodiments relate to an electronic device using Bluetooth communication and a method of operating the same.

2. Description of Related Art

With the development of wireless communication technology, electronic devices can communicate with other electronic devices through various wireless communication techniques. Bluetooth communication technology is a short-range wireless communication technique which enables electronic devices to be connected with each other and to exchange data or information. Electronic devices can share data with each other using Bluetooth communication technology while consuming low power.

According to a method of connecting electronic devices to each other using Bluetooth communication, when a master device activates a Bluetooth function and transmits a connection request, a slave device identifies connection requests transmitted from neighboring electronic devices. The slave device may select an electronic device to which the slave device desires to connect from among the neighboring electronic devices transmitting the connection request and may establish a connection (i.e., may pair) with the selected electronic device. Electronic devices may automatically attempt to connect to electronic devices with which a connection has been established every time the power or Bluetooth function of each electronic device is activated.

SUMMARY

According to the conventional art, only electronic devices that have been connected using Bluetooth communication attempt to establish a connection with each other, and thus a separate connection operation may be required in order to connect a new electronic device with an electronic device that supports Bluetooth. For example, to connect an electronic device with an electronic device supporting Bluetooth, it may be necessary to suspend a connection with a previously connected device, to find a new electronic device, and to establish a connection with the new electronic device.

According to various embodiments, there may be provided an electronic device that receives a connection request transmitted from a second external device to a first external device using information about Bluetooth communication of the first external device that the first external device shares with the electronic device and establishes a connection with the second external device using the received connection request, and a method of operating the same.

An electronic device according to various embodiments may include: a display; a first wireless communication circuit configured to support Bluetooth (BT) communication and to include a first BT address; a processor configured to be operatively connected to the display and the first wireless communication circuit; and a memory configured to be operatively connected to the processor, wherein the memory may store instructions that are configured to, when executed, cause the processor to: receive first data including a second BT address associated with a first external device; perform a page scan based on the first BT address and the second BT address using the BT communication; receive second data based on the second BT address from a second external device using the BT communication; identify information for connection with the second external device based on the second data using the BT communication; and provide a user interface for connection with the second external device through the display based on the identified information.

An electronic device according to various embodiments may include: a display; a first wireless communication circuit configured to support Bluetooth (BT) communication and to include a first BT address; a processor configured to be operatively connected to the display and the first wireless communication circuit; and a memory configured to be operatively connected to the processor, wherein the memory may store instructions that are configured to, when executed, cause the processor to: receive first data including a second BT address associated with BT communication of a first external device and connection information; perform a page scan based on the first BT address and the second BT address using the BT communication; receive second data based on the second BT address from a second external device using the BT communication; transmit response data to the second external device based on the second BT address using the BT communication in response to reception of the second data; receive a frequency hop synchronization (FHS) packet from the second external device using the BT communication; identify a third BT address of the second external device included in the FHS packet; identify whether the third BT address is included in the connection information included in the first data; and provide a user interface for connection with the second external device through the display based on the identification result.

An electronic device according to various embodiments may include: a first wireless communication circuit configured to support Bluetooth (BT) communication using a first BT address; a processor; and a memory, wherein the memory may store instructions that, when executed, cause the processor to: obtain first data associated with BT communication of a first external device; perform a page scan based on the first BT address and a second BT address of the first external device included in the first data through the first wireless communication circuit; receive second data based on the second BT address from a second external device through the first wireless communication circuit; identify information for connection with the second external device based on the second data; and establish a connection with the second external device using the first wireless communication circuit based on the identification result.

An electronic device according to various embodiments may include: a Bluetooth (BT) communication circuit configured to perform wireless communication with at least one external device and to include a first BT address; a processor; and a memory configured to be operatively connected to the processor and to store a second BT address associated with BT communication of a first external device, wherein the BT communication circuit may be configured to: receive the second BT address from the processor, perform a page scan on a second external device using the first BT address and the second BT address; and provide a result of the page scan based on the first BT address and the second BT address to the processor.

An electronic device according to various embodiments can readily establish a connection with a different electronic device, which has been connected to a previously used electronic device, using Bluetooth communication information about the previously used electronic device without any separate connection operation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 15D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
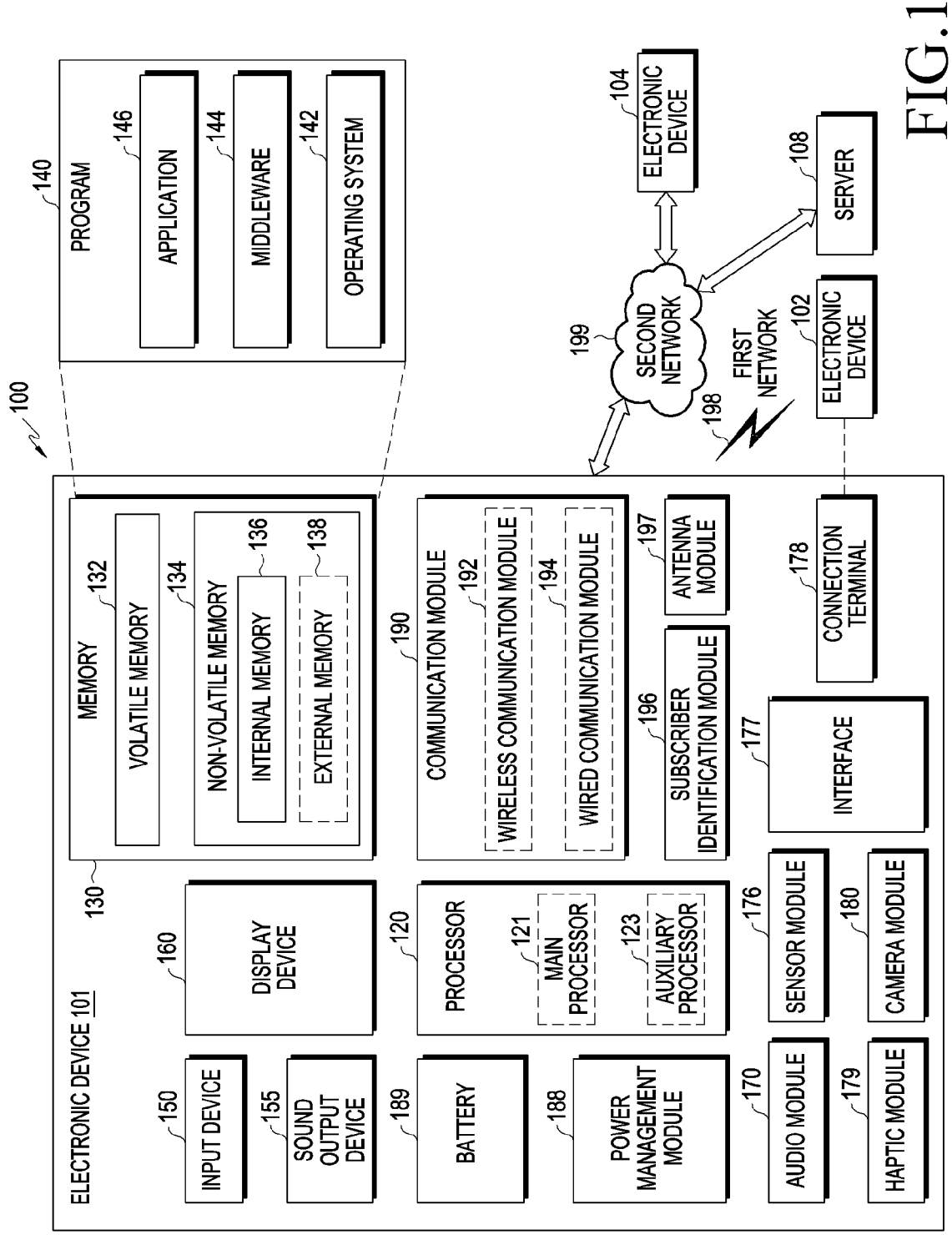
FIG. 1 is a block diagram illustrating an electronic device in a network environment according to various exemplary embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Terms used herein may have the same meanings as specified in the Bluetooth standard. However, the technical idea of the disclosure is not limited by these terms.

Figure 2:
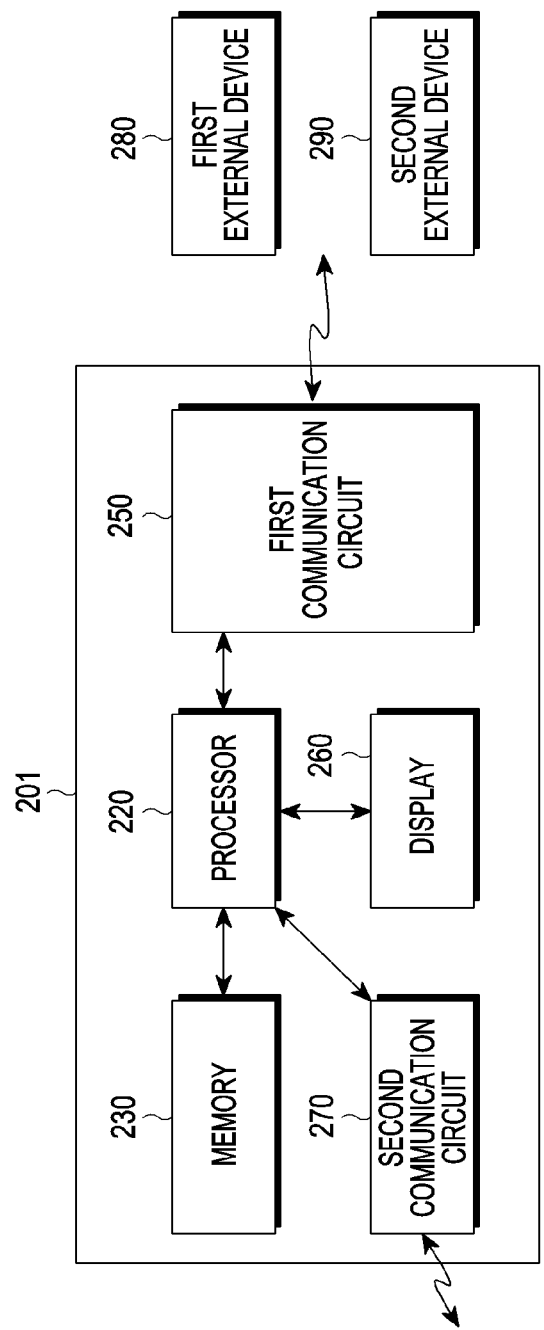
FIG. 2 is a block diagram schematically illustrating an electronic device according to various embodiments.

FIG. 2 is a block diagram schematically illustrating an electronic device according to various embodiments.

Referring to FIG. 2, the electronic device 201 may include a processor 220, a memory 230, a first communication circuit 250, a display 260, and a second communication circuit 270.

According to various embodiments, the electronic device 201 may be configured to be substantially the same as or similar to the electronic device 101 of FIG. 1. For example, the electronic device 201 may be configured as a smartphone supporting Bluetooth communication.

According to various embodiments, the electronic device 201 may be connected (or paired) with a first external device 280 or a second external device 290 using the first communication circuit 250 (e.g., Bluetooth communication). For example, the first external device 280 and/or the second external device 290 may be configured to be substantially the same as or similar to the electronic device 102 or 104 illustrated in FIG. 1. For example, the first external device 280 and/or the second external device 290 may be configured as electronic devices supporting Bluetooth communication.

Hereinafter, for convenience of description, a Bluetooth address of the electronic device 201 is defined as a first Bluetooth address, a Bluetooth address of the first external device 280 is defined as a second Bluetooth address, and a Bluetooth address of the second external device 290 is defined as a third Bluetooth address.

According to various embodiments, the electronic device 201 may perform a page scan on the first Bluetooth address and the second Bluetooth address at separate times, may receive an ID packet and/or an FHS packet based on the second Bluetooth address from an external electronic device (e.g., the second external device 290), and may connect for Bluetooth communication with an external electronic device using the first Bluetooth address.

According to various embodiments, the processor 220 may control the overall operation of the electronic device 201. The processor 220 may be configured to be substantially the same as or similar to the processor 120 of FIG. 1. For example, the processor 220 may be configured as a host specified according to the Bluetooth standard.

According to various embodiments, the processor 220 may obtain first data associated with Bluetooth communication of the first external device 280. For example, the first data may include the Bluetooth address of the first external device 280 and/or a list (e.g., a Bluetooth address and/or a device name) of a paired device performing Bluetooth communication with the first external device 280 (e.g., the second external device 290 previously connected (or paired) with the first external device 280 using Bluetooth communication). For example, the paired device may refer to a Bluetooth device having a history of generating a link key specified according to the Bluetooth standard. The list of paired devices (hereinafter, "paired device list") may refer to a list of Bluetooth devices having a history of being paired with the first external device 280.

According to various embodiments, the processor 220 may perform a page scan on the basis of the first Bluetooth address and the second Bluetooth address of the first external device 280 included in the first data through the first communication circuit 250. Alternatively, the first communication circuit 250 may perform a page scan without control of the processor 220. According to various embodiments, the processor 220 performing a particular operation through the first communication circuit 250 may also include the first communication circuit 250 performing the particular operation without the control of the processor 220. For example, as specified in the Bluetooth standard, a page scan may refer to an operation for receiving a connection request from a counterpart electronic device (e.g., an operation of identifying whether there is a connection request signal). Further, as specified in the Bluetooth standard, "paging" may refer to an operation of attempting a connection request to a counterpart electronic device (e.g., an operation of transmitting a connection request signal).

According to various embodiments, the processor 220 may alternately perform a page scan on the first Bluetooth address and a page scan on the second Bluetooth address through the first communication circuit 250. That is, the processor 220 may control the first communication circuit 250 to alternately perform a page scan on the first Bluetooth address and a page scan on the second Bluetooth address. The first communication circuit 250 may perform a page scan on the basis of the first Bluetooth address for a first time and may perform a page scan on the basis of the second Bluetooth address for a second time. For example, the first time and the second time may be 1.28 s and 11.25 ms, respectively. The first time and the second time may be dynamically changed, or may be changed by a user. Accordingly, the first communication circuit 250 may perform a page scan on the first Bluetooth address and a page scan on the second Bluetooth address together.

The processor 220 may receive second data from the second external device 290 through the first communication circuit 250 while performing a page scan on the basis of the second Bluetooth address. For example, the second data may include information about a connection request that the second external device 290 transmits to the first external device 280. For example, the second data may include an ID packet corresponding to a paging operation based on the second Bluetooth address that is performed by the second external device 290. That is, the processor 220 may receive the ID packet that the second external device 290 transmits to the first external device 280 through the first communication circuit 250.

According to various embodiments, the processor 220 may identify information for connection to the second external device 290 using Bluetooth communication on the basis of the second data received through the first communication circuit 250. For example, the processor 220 may identify information about the second external device 290 (e.g., the Bluetooth address) on the basis of data (e.g., a frequency hop synchronization (FHS) packet) received from the second external device 290. For example, the processor 220 may identify whether a Bluetooth address included in the FHS packet is included in the shared paired device list of the first external device 280 and may identify a corresponding device name at least on the basis of the identification result. Further, the processor 220 may identify whether the second external device 290 is included in the paired device list of the first external device 280. The processor 220 may identify whether a connection is established depending on whether the second external device 290 is included in the paired device list of the first external device 280.

According to various embodiments, the processor 220 may provide a user interface on the basis of the identified information about the second external device 290. The processor 220 may provide a user interface for identifying whether a connection is established to the user through the display 260. For example, the user interface may include the identified information about the second external device 290. The processor 220 may identify whether a connection is established depending on input performed on the user interface.

The processor 220 may perform a connection operation using Bluetooth communication according to the identification result and may connect with the second external device 290 using Bluetooth communication.

According to various embodiments, the memory 230 may store data or instructions associated with the operation of the electronic device 201. Further, the memory 230 may store information associated with Bluetooth communication of the first external device 280. For example, the information associated with Bluetooth communication of the first external device 280 may include the Bluetooth address of the first external device 280 and the paired device list of the first external device 280.

According to various embodiments, the first communication circuit 250 may communicate with an external device through wireless communication. For example, the first communication circuit 250 may support Bluetooth communication. The first communication circuit 250 may be configured as a controller specified according to the Bluetooth standard.

According to various embodiments, the first communication circuit 250 may include the first Bluetooth address or may have the first Bluetooth address allocated thereto.

According to various embodiments, the first communication circuit 250 may receive the second Bluetooth address based on the first data associated with Bluetooth communication of the first external device 280 from the processor 220. The first communication circuit 250 may perform a page scan on the basis of the first Bluetooth address and the second Bluetooth address under the control of the processor 220. Further, the first communication circuit 250 may obtain the result of the page scan based on the first Bluetooth address and the second Bluetooth address and may report the obtained result of the page scan to the processor 220.

According to various embodiments, the display 260 may provide a notification indicating a state of communication between the electronic device 201 and an external device. For example, the display 260 may display (or provide) a user interface for identifying a connection with an external device. Further, the display 260 may display a user interface indicating the state of a connection with an external device.

According to various embodiments, the second communication circuit 270 may communicate with an external device through wireless communication. For example, the second communication circuit 270 may support at least one of Wi-Fi and cellular network communication. The processor 220 may communicate with the first external device 280 and/or a server (or a cloud sever) through the second communication circuit 270. For example, the processor 220 may receive information about Bluetooth communication of the first external device 280 through the second communication circuit 270. For example, the information about Bluetooth communication may include the Bluetooth address of the first external device 280 and the paired device list of the first external device 280.

According to various embodiments, the electronic device 201 may further include an output device. For example, the electronic device 201 may indicate the state of a connection between the electronic device 201 and an external device (e.g., 280 and/or 290) through visual, auditory, and/or tactile output, such as light, a sound, and/or vibrations, provided by the output device.

Although the electronic device 201 of FIG. 2 is illustrated as including one first communication circuit supporting Bluetooth for convenience of description, the electronic device 201 may include a plurality of communication circuits supporting Bluetooth according to various embodiments.

Figure 3:
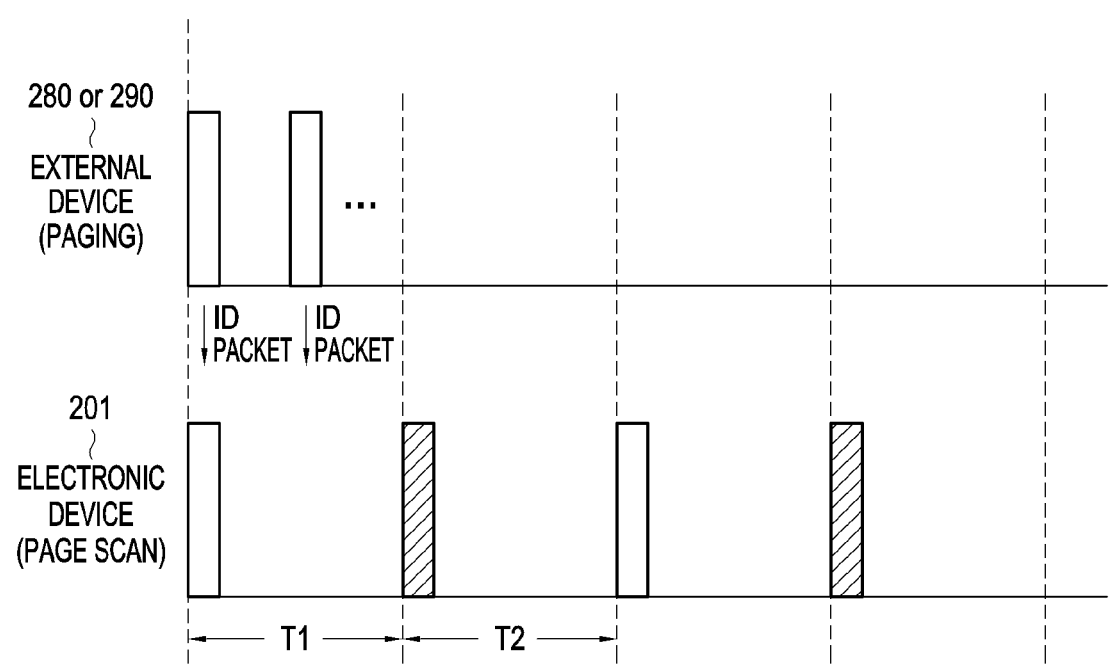
FIG. 3 is a graph illustrating a method in which an electronic device performs a page scan according to various embodiments.

FIG. 3 is a graph illustrating a method in which an electronic device performs a page scan according to various embodiments.

Referring to FIG. 3, the electronic device 201 (e.g., the processor 220) may perform a page scan on the basis of the first Bluetooth address and the second Bluetooth address of the first external device 280 included in the first data through the first communication circuit 250. For example, the electronic device 201 may alternately perform a page scan on the first Bluetooth address and a page scan on the second Bluetooth address. Alternatively, the electronic device 201 may perform a page scan on the first Bluetooth address and/or a page scan on the second Bluetooth address and, after a certain period of time (e.g., after receiving the paired device list), may perform only a page scan on the second Bluetooth address. That is, the electronic device 201 may perform a page scan on the first Bluetooth address and a page scan on the second Bluetooth address through the first communication circuit 250 in various manners.

According to various embodiments, the electronic device 201 (e.g., the processor 220) may perform a page scan on the basis of the first Bluetooth address for a first time (T1), and may perform a page scan on the basis of the second Bluetooth address for a second time (T2) through the first communication circuit 250. The electronic device 201 may open a plurality of channels (e.g., at least some of 32 channels, indicated by a transparent bar in FIG. 3) relating to the first Bluetooth address to perform a page scan thereon for the first time (T1), and may open a plurality of channels (e.g., at least some of 32 channels, indicated by a slashed bar in FIG. 3) relating to the second Bluetooth address to perform a page scan thereon for the second time (T2). Accordingly, the electronic device 201 may perform a page scan on the first Bluetooth address and a page scan on the second Bluetooth address together.

According to various embodiments, when the electronic device 201 receives an ID packet from the second external device 290 through the first communication circuit 250 via any one channel among the plurality of opened channels while performing a page scan on the basis of the second Bluetooth address, the electronic device 201 may respond with the same ID packet through the channel. Accordingly, the electronic device 201 may perform an operation of connecting with the second external device 290 using Bluetooth communication.

Figure 4:
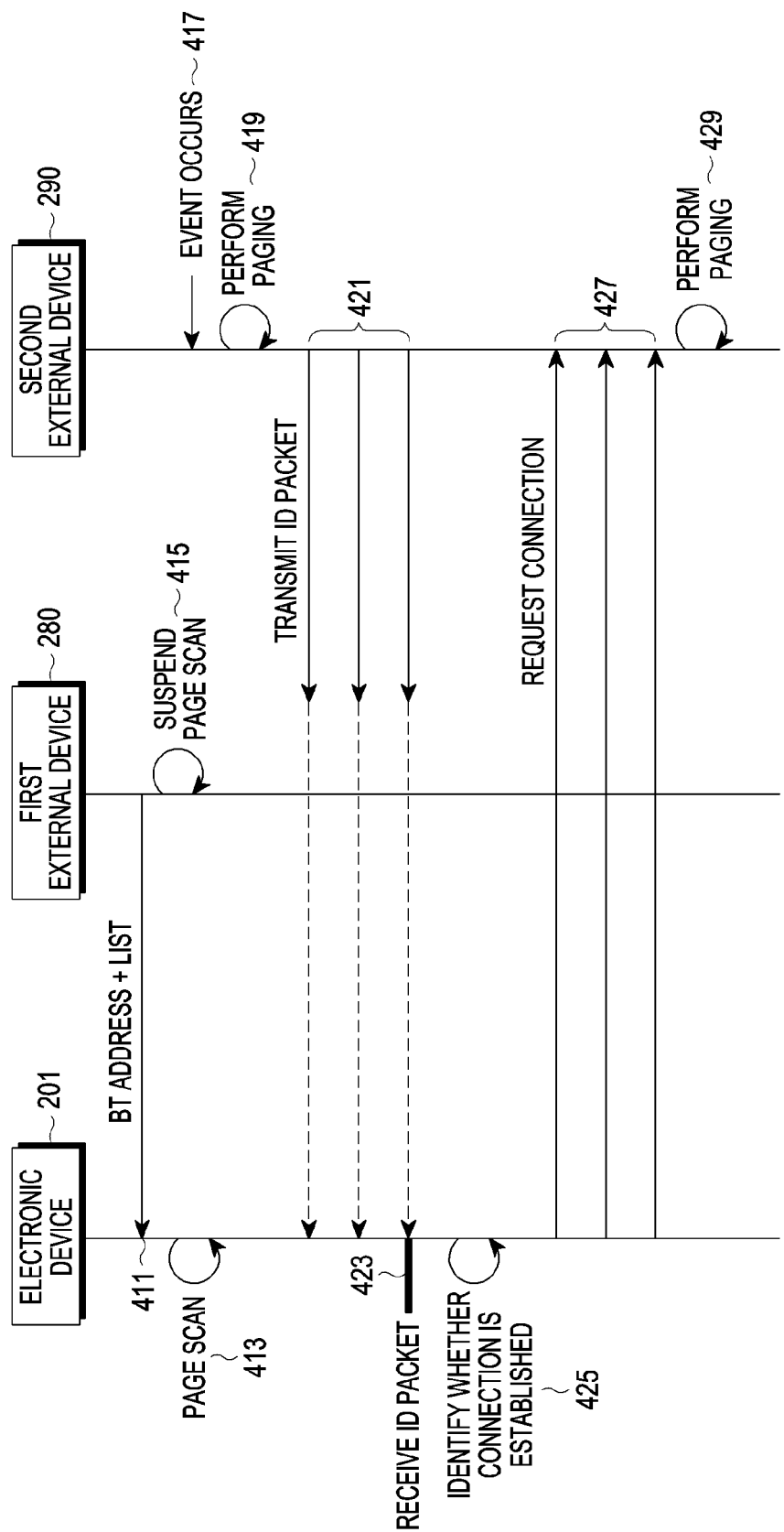
FIG. 4 is data flow illustrating a method in which an electronic device connects with a second external device according to various embodiments.

FIG. 4 is data flow illustrating a method in which an electronic device connects with a second external device according to various embodiments.

Referring to FIG. 4, in operation 411, the electronic device 201 may obtain the second Bluetooth address associated with the first external device 280 (e.g., the Bluetooth address of the first external device 280) and/or the paired device list of the first external device 280.

According to various embodiments, the electronic device 201 may obtain the second Bluetooth address and/or the paired device list from the first external device 280. After the electronic device 201 establishes a communication connection with the first external device 280, the electronic device 201 may receive the second Bluetooth address and/or the paired device list shared by the first external device 280 at the request of the electronic device 201 or at the request of the first external device 280.

According to various embodiments, the electronic device 201 may also obtain the second Bluetooth address and/or the paired device list from a server. For example, the electronic device 201 may obtain the second Bluetooth address and/or the paired device list from the server on the basis of a user account.

In operation 413, the electronic device 201 may perform a page scan on the basis of the first Bluetooth address and the second Bluetooth address. For example, when the electronic device 201 receives the second Bluetooth address and the paired device list of the first external device 280, the electronic device 201 may perform a page scan after a designated time. Alternatively, the electronic device 201 may perform a page scan when an operation associated with Bluetooth is executed, when a particular application is executed (e.g., a backup data install application), or when there is a request from the first external device 280 (e.g., a user's page scan request).

In operation 415, the first external device 280 may suspend the page scan or may maintain the suspended state thereof. For example, the first external device 280 may suspend the page scan before the electronic device 201 starts the page scan. While the first external device 280 is performing a communication connection with the electronic device 201, the first external device 280 may suspend the communication connection with the electronic device 201 during suspension of the page scan (or before suspending the page scan). When the first external device 280 is not present in the same space as the electronic device 201 (e.g., when the first external device 280 is out of a Bluetooth-communication-enabled range), the page scanning may not be suspended.

According to various embodiments, operation 415 and operation 413 may be performed simultaneously, or may be reordered.

In operation 417, a designated event may occur in the second external device 290. For example, the designated event may include an event of turning on the power which is turned off or an event of receiving an input to execute a page scan. Alternatively, the designated event may be an event of a link supervision timeout (LSTO). Alternatively, the designated event may be an operation of the second external device 290 suspending an existing connection with the server or the first external device 280 when the first external device 280 shares the first Bluetooth address and/or the paired device list.

In operation 419, the second external device 290 may perform a paging operation when the designated event occurs. For example, the paging operation may include an operation of the second external device 290 reconnecting with the first external device on the basis of the history of connection with the first external device 280.

In operation 421, the second external device 290 may transmit data for a connection request to the first external device 280. For example, the second external device 290 may generate a device access code (DAC) using the second Bluetooth address and may transmit an ID packet including the generated DAC to the first external device 280. For example, the second external device 290 may broadcast the ID packet. The period in which the second external device 290 requests a connection to the first external device 280 may be determined in consideration of usability, a power source, and/or a battery capacity. Although FIG. 4 illustrates the transmission of three ID packets, the number of transmitted ID packets is not limited thereto.

In operation 423, the electronic device 201 may receive the ID packet from the second external device 290. According to one embodiment, the electronic device 201 may perform a page scan on the basis of the second Bluetooth address, thereby receiving the ID packet, transmitted by the second external device 290 to the first external device 280, instead of the first external device 280. The electronic device 201 may receive the ID packet when located within a distance within which it is possible to receive the ID packet from the second external device 290.

In operation 425, the electronic device 201 may identify whether the electronic device 201 is connected with the second external device 290 using the ID packet. For example, the first communication circuit 250 of the electronic device 201 may report to the processor 220 that the ID packet is received, and the processor 220 may display a user interface indicating that there is a connection request from the second external device 290 through the display 260. Here, the electronic device 201 may determine whether to connect to the second external device 290 according to input (e.g., connection acceptance or connection rejection) performed on the user interface.

In operation 427, when a connection acceptance input is received, the electronic device 201 may transmit data for a connection request to the second external device 290. For example, the electronic device 201 may transmit an ID packet based on the first Bluetooth address to the second external device 290. Although FIG. 4 illustrates transmission of three ID packets, the number of transmitted ID packets is not limited thereto.

In operation 429, the second external device 290 may perform an operation of pairing with the electronic device 201 on the basis of the ID packet based on the first Bluetooth address.

Figure 5A:
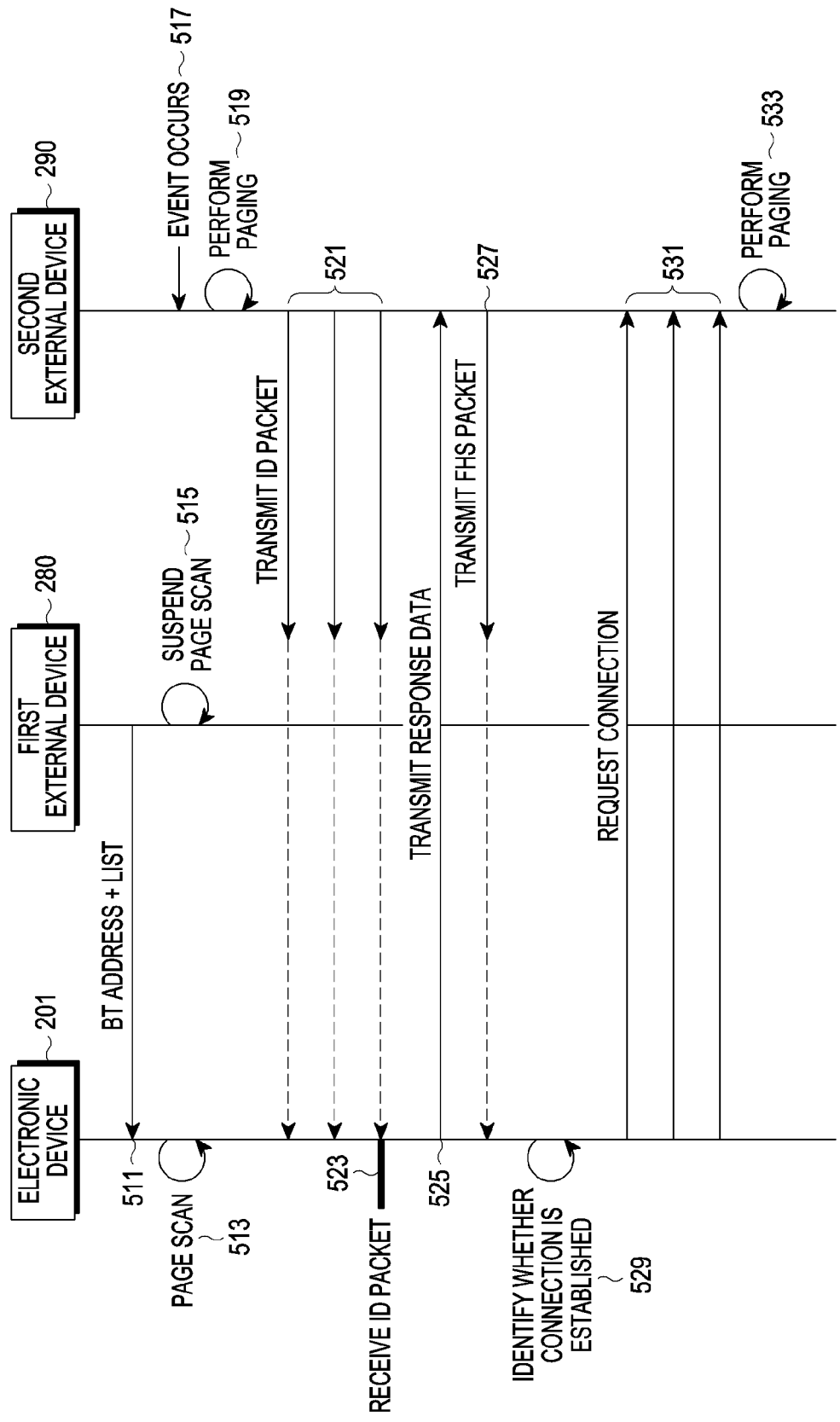
FIG. 5A is data flow illustrating a method in which an electronic device connects with a second external device according to various embodiments.
Figure 5B:
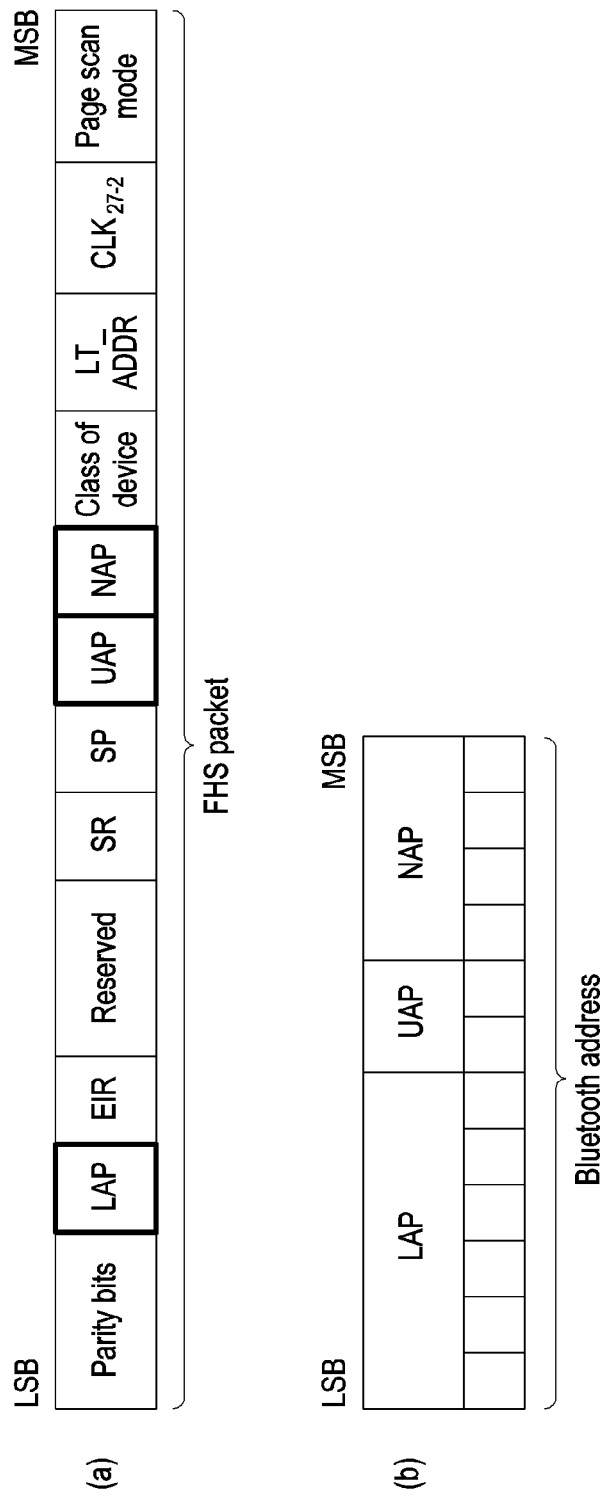
FIG. 5B is a block diagram illustrating a method in which the electronic device of FIG. 5A identifies the address of a second external device.

FIG. 5A is data flow illustrating a method in which an electronic device connects with a second external device according to various embodiments. FIG. 5B is a block diagram illustrating a method in which the electronic device of FIG. 5A identifies the address of a second external device.

Referring to FIG. 5A, in operation 511, the electronic device 201 may obtain the second Bluetooth address associated with the first external device 280 (e.g., the Bluetooth address of the first external device 280) and/or the paired device list of the first external device 280.

According to various embodiments, the electronic device 201 may obtain the second Bluetooth address and/or the paired device list from the first external device 280. After the electronic device 201 establishes a communication connection with the first external device 280, the electronic device 201 may receive the second Bluetooth address and/or the paired device list shared by the first external device 280 at the request of the electronic device 201 or at the request of the first external device 280.

According to various embodiments, the electronic device 201 may also obtain the second Bluetooth address and/or the paired device list from a server. For example, the electronic device 201 may obtain the second Bluetooth address and/or the paired device list from the server on the basis of a user account.

According to various embodiments, the electronic device 201 may also obtain the second Bluetooth address and/or the paired device list from the server through a particular application (e.g., a smart switch).

In operation 513, the electronic device 201 may perform a page scan on the basis of the first Bluetooth address and the second Bluetooth address. For example, when the electronic device 201 receives the second Bluetooth address and the paired device list, the electronic device 201 may perform a page scan after a designated time. Alternatively, the electronic device 201 may perform a page scan when an operation associated with Bluetooth is executed, when a particular application (e.g., a backup data install application) is executed, or when there is a request from the first external device 280 (e.g., a user's page scan request).

In operation 515, the first external device 280 may suspend the page scan or may maintain the suspended state thereof. For example, the first external device 280 may suspend the page scan before the electronic device 201 starts the page scan. While the first external device 280 is performing a communication connection with the electronic device 201, the first external device 280 may suspend the communication connection with the electronic device 201 at the same time as suspending the page scan (or before suspending the page scan). When the first external device 280 is not present in the same space as the electronic device 201 (e.g., when the first external device 280 is out of a Bluetooth-communication-enabled range), the page scanning may not be suspended.

According to various embodiments, operation 515 and operation 513 may be performed simultaneously or may be reordered.

In operation 517, a designated event may occur in the second external device 290. For example, the designated event may include an event of turning on the power which is turned off or an event of receiving input to execute a page scan. Alternatively, the designated event may be a link supervision timeout (LSTO) event.

In operation 519, the second external device 290 may perform a paging operation when the designated event occurs. For example, the paging operation may include an operation of the second external device 290 reconnecting with the first external device on the basis of the history of connection with the first external device 280.

In operation 521, the second external device 290 may transmit data for a connection request to the first external device 280. For example, the second external device 290 may transmit an ID packet to the first external device 280. For example, the second external device 290 may broadcast the ID packet.

In operation 523, the electronic device 201 may receive the ID packet from the second external device 290. That is, the electronic device 201 may perform a page scan on the basis of the second Bluetooth address, thereby receiving the ID packet, transmitted by the second external device 290 to the first external device 280, instead of the first external device 280. Here, the electronic device 201 may be located within a distance within which it is possible to receive the ID packet from the second external device 290.

In operation 525, the electronic device 201 may transmit response data to the second external device 290 in response to the ID packet. For example, the response data may be the ID packet received by the electronic device 201.

In operation 527, the second external device 290 may transmit an FHS packet in response to reception of the response data. The FHS packet may include information about the second external device 290, such as the Bluetooth address, clock information, and/or an LT address of the second external device 290. The electronic device 201 may receive the FHS packet from the second external device 290. In one embodiment, upon receiving the FHS packet, the electronic device 201 may retransmit the ID packet as response data.

In operation 529, the electronic device 201 may identify whether the electronic device 201 is connected to the second external device 290 using the FHS packet. For example, the first communication circuit 250 of the electronic device 201 may report to the processor 220 that the FHS packet is received, and the processor 220 may identify the information about the second external device 290 using the FHS packet.

Referring to FIG. 5B, the processor 220 may identify the third Bluetooth address of the second external device 290 using the FHS packet. For example, the processor 220 may identify the third Bluetooth address using 'LAP', 'UAP', and 'NAP' included in the FHS packet. The processor 220 may identify the third Bluetooth address of 6 bytes through 'LAP', 'UAP', and 'NAP'.

According to various embodiments, the electronic device 201 may identify whether the third Bluetooth address (e.g., the Bluetooth address of the second external device 290) is included in a paired device list received from the first external device 280. When the third Bluetooth address is included in the paired device list, the processor 220 may display a user interface indicating that there is a connection request from the second external device 290 through the display 260. The electronic device 201 may determine whether to connect to the second external device 290 according to input (e.g., connection acceptance or connection rejection) performed on the user interface.

In operation 531, when a connection acceptance input is received, the electronic device 201 may transmit data for a connection request to the second external device 290. For example, the electronic device 201 may transmit an ID packet based on the first Bluetooth address to the second external device 290.

In operation 533, the second external device 290 may perform an operation of pairing with the electronic device 201 on the basis of the ID packet based on the first Bluetooth address.

Figure 6:
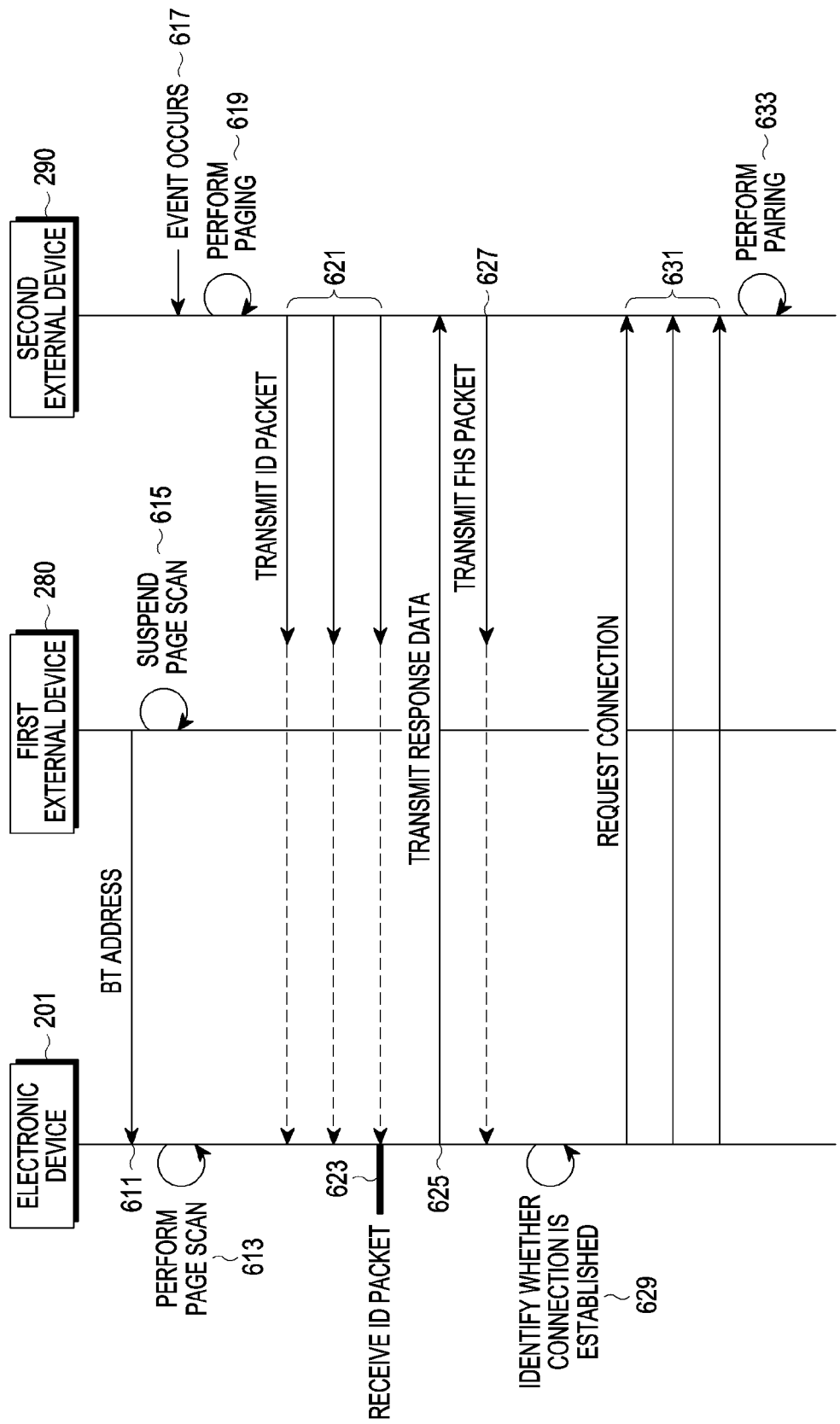
FIG. 6 is data flow illustrating a method in which an electronic device connects with a second external device according to various embodiments.

FIG. 6 is data flow illustrating a method in which an electronic device connects with a second external device according to various embodiments.

Referring to FIG. 6, in operation 611, the electronic device 201 may obtain the second Bluetooth address associated with the first external device 280 (e.g., the Bluetooth address of the first external device 280).

According to various embodiments, the electronic device 201 may obtain the second Bluetooth address from the first external device 280. After the electronic device 201 establishes a communication connection with the first external device 280, the electronic device 201 may receive the second Bluetooth address shared by the first external device 280 at the request of the electronic device 201 or at the request of the first external device 280.

According to various embodiments, the electronic device 201 may also obtain the second Bluetooth address from a server. For example, the electronic device 201 may obtain the second Bluetooth address from the server on the basis of a user account.

Compared to FIG. 5, FIG. 6 illustrates an embodiment of the operation of the electronic device 201 in the case in which a paired list of the first external device 280 is not received.

In operation 613, the electronic device 201 may perform a page scan on the basis of the first Bluetooth address and the second Bluetooth address. For example, when the electronic device 201 receives the second Bluetooth address, the electronic device 201 may perform a page scan after a designated time. Alternatively, the electronic device 201 may perform a page scan when an operation associated with Bluetooth is executed, when a particular application (e.g., a backup data install application) is executed, or when there is a request from the first external device 280 (e.g., a user's page scan request).

In operation 615, the first external device 280 may suspend the page scan or may maintain the suspended state thereof. For example, the first external device 280 may suspend the page scan before the electronic device 201 starts the page scan. When the first external device 280 is establishing a communication connection with the electronic device 201, the first external device 280 may suspend the communication connection with the electronic device 201 at the same time as suspending the page scan (or before suspending the page scan). When the first external device 280 is not present in the same space as the electronic device 201 (e.g., when the first external device 280 is out of a Bluetooth-communication-enabled range), the page scanning may not be suspended.

According to various embodiments, operation 615 and operation 613 may be performed simultaneously or may be reordered.

In operation 617, a designated event may occur in the second external device 290. For example, the designated event may include an event of turning on the power which is turned off or an event of receiving an input to execute a page scan. Alternatively, the designated event may be an event of a link supervision timeout (LSTO). Alternatively, the designated event may be an operation of the second external device 290 suspending an existing connection with the server or the first external device 280 when the first external device 280 shares the first Bluetooth address.

In operation 619, the second external device 290 may perform a paging operation when the designated event occurs. For example, the paging operation may include an operation of the second external device 290 reconnecting with the first external device on the basis of the history of connection with the first external device 280.

In operation 621, the second external device 290 may transmit data for a connection request to the first external device 280. For example, the second external device 290 may transmit an ID packet to the first external device 280.

In operation 623, the electronic device 201 may receive the ID packet from the second external device 290. That is, the electronic device 201 may perform a page scan on the basis of the second Bluetooth address, thereby receiving the ID packet, transmitted by the second external device 290 to the first external device 280, instead of the first external device 280. Here, the electronic device 201 may be located within a distance within which it is possible to receive the ID packet from the second external device 290.

In operation 625, the electronic device 201 may transmit response data to the second external device 290 in response to the ID packet. For example, the response data may be the ID packet received by the electronic device 201.

In operation 627, the second external device 290 may transmit an FHS packet in response to reception of the response data. The FHS packet may include information about the second external device 290, such as the Bluetooth address, clock information, and/or an LT address of the second external device 290. The electronic device 201 may receive the FHS packet from the second external device 290. In one embodiment, upon receiving the FHS packet, the electronic device 201 may retransmit the ID packet as response data.

In operation 629, the electronic device 201 may identify whether the electronic device 201 is connected to the second external device 290 using the FHS packet. For example, the first communication circuit 250 of the electronic device 201 may report to the processor 220 that the FHS packet is received, and the processor 220 may identify the information about the second external device 290 using the FHS packet. For example, the processor 220 may identify the third Bluetooth address of the second external device 290 (e.g., the Bluetooth address of the second external device 290).

According to various embodiments, the processor 220 may display a user interface indicating that there is a connection request from the second external device 290 through the display 260. For example, the user interface may include the information about the second external device 290 (e.g., the third Bluetooth address). The electronic device 201 may determine whether to connect to the second external device 290 according to input (e.g., connection acceptance or connection rejection) performed on the user interface.

In operation 631, when a connection acceptance input is received, the electronic device 201 may transmit data for a connection request to the second external device 290. For example, the electronic device 201 may transmit an ID packet based on the first Bluetooth address to the second external device 290.

In operation 633, the second external device 290 may perform an operation of pairing with the electronic device 201 on the basis of the ID packet based on the first Bluetooth address.

Figure 7:
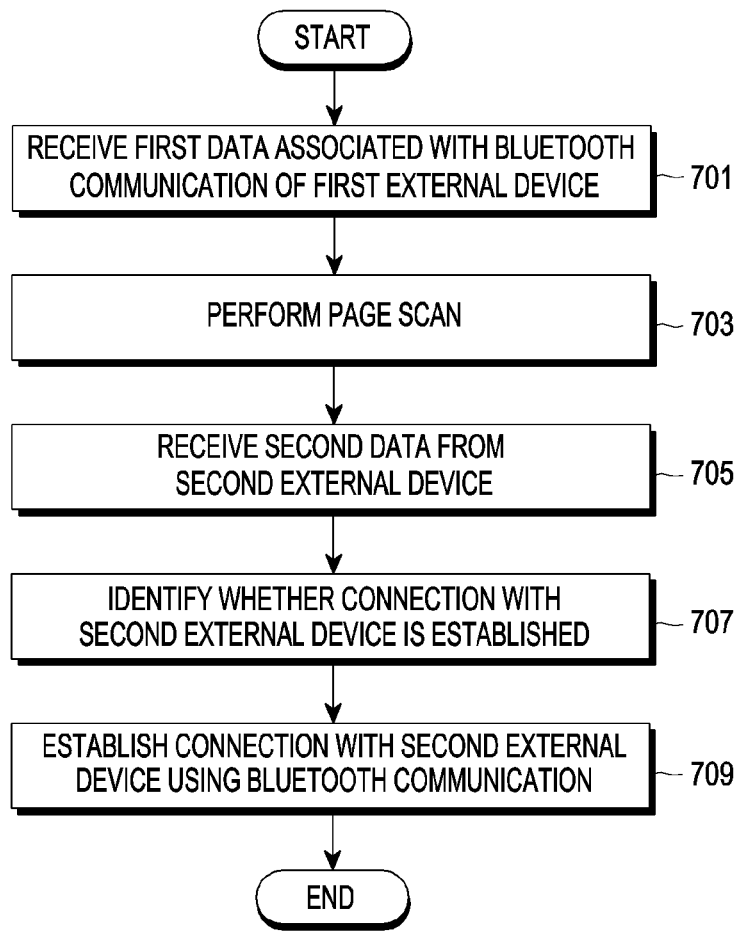
FIG. 7 is a flowchart illustrating a method in which an electronic device connects with a second external device according to various embodiments.

FIG. 7 is a flowchart illustrating a method in which an electronic device connects with a second external device according to various embodiments.

Referring to FIG. 7, in operation 701, an electronic device (e.g., the electronic device 201 of FIG. 2) may receive first data associated with Bluetooth communication of a first external device (e.g., the first external device 280 of FIG. 2) through a communication circuit (e.g., the first communication circuit 250 of FIG. 2). For example, the first data may include the Bluetooth address of the first external device 280 (e.g., the second Bluetooth address). In addition, the first data may also include the paired device list of the first external device 280. For example, the electronic device 201 may receive the second Bluetooth address and/or the paired device list from the first external device 280. Alternatively, when the first data is stored in a server, the electronic device 201 may receive the second Bluetooth address and/or the paired device list from the server. For example, the electronic device 201 may receive the second Bluetooth address and/or the paired device list from the server via a user account with the server.

In operation 703, the electronic device 201 may perform a page scan on the basis of the first Bluetooth address thereof and the second Bluetooth address included in the first data. According to one embodiment, the electronic device 201 may perform a page scan only on the basis of the second Bluetooth address.

In operation 705, the electronic device 201 may receive second data from a second external device (e.g., the second external device 290 of FIG. 2) while performing the page scan. For example, the second data may refer to data for a connection request that the second external device 290 transmits to the first external device 280. For example, the second data may be an ID packet including a DAC based on the second Bluetooth address of the first external device 280.

In operation 707, the electronic device 201 may identify whether the electronic device 201 is connected to the second external device 290 on the basis of the received second data. For example, the electronic device 201 may obtain information about the second external device 290 on the basis of the received second data. The electronic device 201 may provide a user interface based on the obtained information about the second external device 290 and may receive input about whether to connect from a user.

In operation 709, the electronic device 201 may establish a connection (or pairing) with the second external device 290 using Bluetooth communication according to the identification result.

Figure 8:
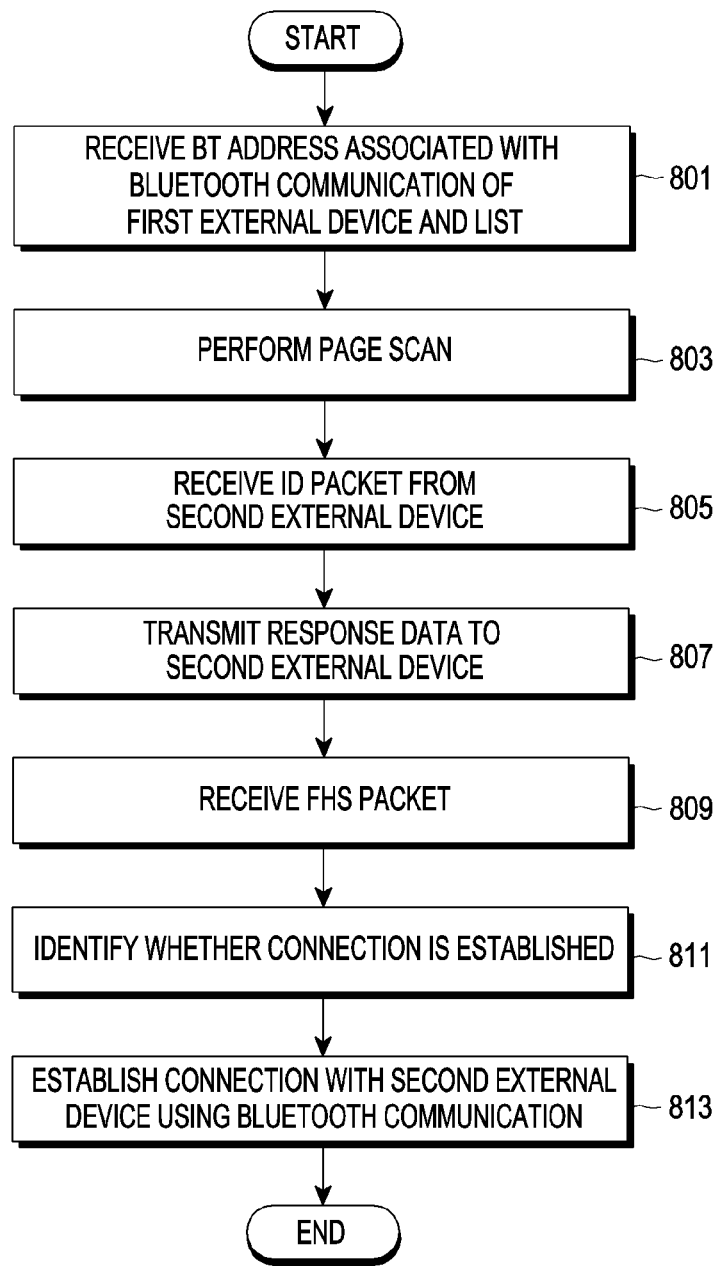
FIG. 8 is a flowchart illustrating a method in which an electronic device connects with a second external device according to various embodiments.

FIG. 8 is a flowchart illustrating a method in which an electronic device connects with a second external device according to various embodiments.

Referring to FIG. 8, in operation 801, an electronic device (e.g., the electronic device 201 of FIG. 2) may receive first data associated with Bluetooth communication of a first external device (e.g., the first external device 280 of FIG. 2) through a communication circuit (e.g., the first communication circuit 250 of FIG. 2). For example, the first data may include a second Bluetooth address (e.g., the Bluetooth address of the first external device 280) and the paired device list of the first external device 280.

In operation 803, the electronic device 201 may perform a page scan on the basis of the first Bluetooth address thereof and the second Bluetooth address included in the first data. According to one embodiment, the electronic device 201 may perform a page scan only on the basis of the second Bluetooth address.

In operation 805, the electronic device 201 may receive second data from a second external device (e.g., the second external device 290 of FIG. 2) while performing the page scan through the communication circuit 250. For example, the second data may refer to data for a connection request that the second external device 290 transmits to the first external device 280. For example, the second data may be an ID packet including a DAC based on the second Bluetooth address of the first external device 280.

In operation 807, upon receiving the ID packet, the electronic device 201 may transmit response data to the second external device 290 through the communication circuit. For example, the response data may be based on the ID packet received by the electronic device 201 or may be the same as the ID packet.

In operation 809, the electronic device 201 may receive an FHS packet from the second external device 290.

In operation 811, the electronic device 201 may identify whether the electronic device 201 is connected to the second external device 290 using the FHS packet. For example, the electronic device 201 may identify information about the second external device 290 using the FHS packet and may provide a user interface including the identified information. The electronic device 201 may provide the information about the second external device 290 (e.g., a device name and/or a Bluetooth address) and may report that a connection request is received from the second external device 290 via the user interface.

In operation 813, the electronic device 201 may determine whether to connect to the second external device 290 according to input (e.g., connection acceptance or connection rejection) performed on the user interface. For example, when connection acceptance input is received through the user interface, the electronic device 201 may establish a connection with the second external device 290 using Bluetooth communication.

Figure 9:
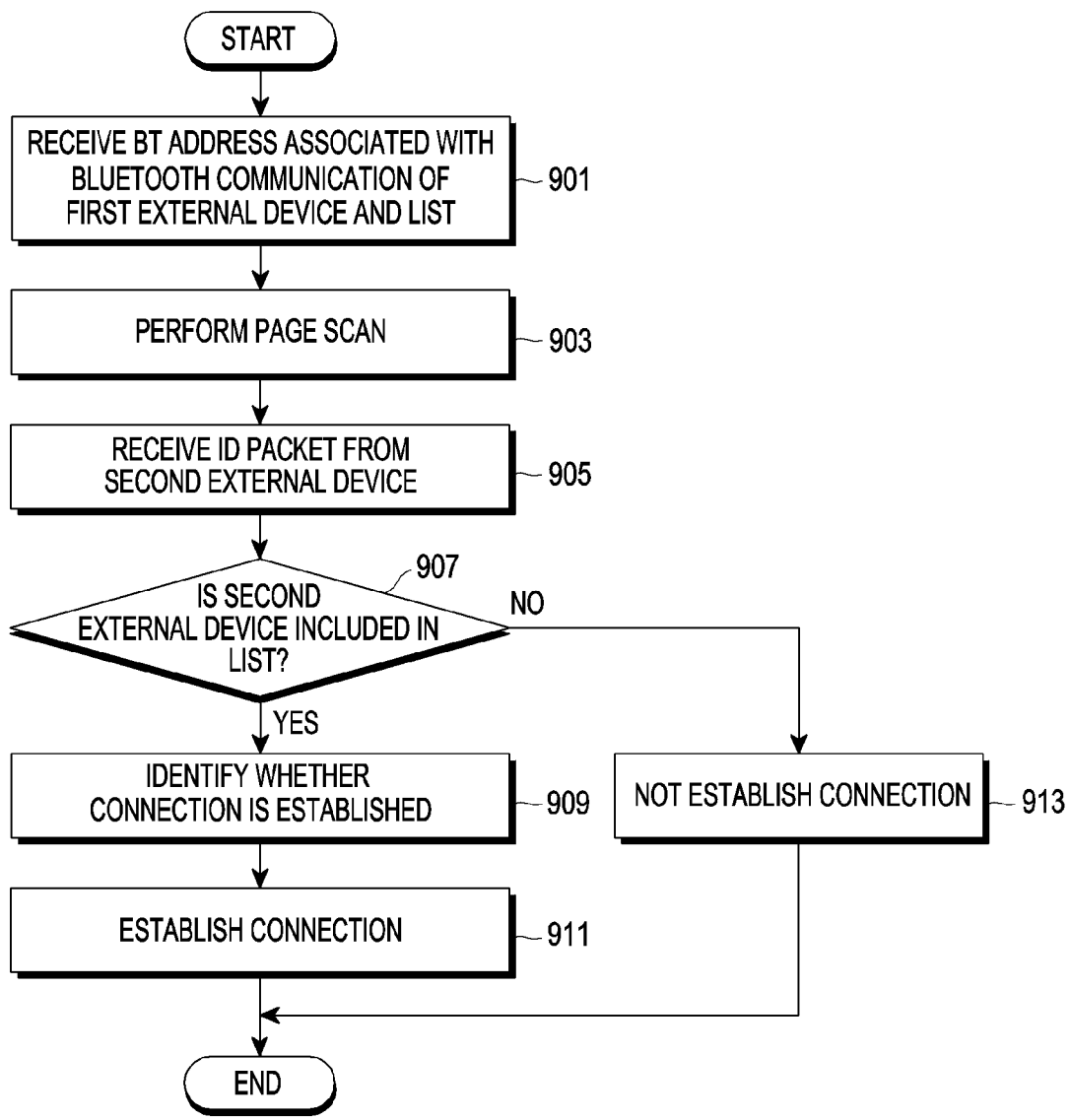
FIG. 9 is a flowchart illustrating a method in which an electronic device connects with a second external device according to various embodiments.

FIG. 9 is a flowchart illustrating a method in which an electronic device connects with a second external device according to various embodiments.

Referring to FIG. 9, in operation 901, an electronic device (e.g., the electronic device 201 of FIG. 2) may receive first data associated with Bluetooth communication of a first external device (e.g., the first external device 280 of FIG. 2). For example, the first data may include a second Bluetooth address (e.g., the Bluetooth address of the first external device 280) and the paired device list of the first external device 280.

In operation 903, the electronic device 201 may perform a page scan on the basis of the first Bluetooth address thereof and the second Bluetooth address included in the first data. According to one embodiment, the electronic device 201 may perform a page scan only on the basis of the second Bluetooth address.

In operation 905, the electronic device 201 may receive second data from a second external device (e.g., the second external device 290 of FIG. 2) while performing the page scan. For example, the second data may refer to data for a connection request that the second external device 290 transmits to the first external device 280, and may be an ID packet including a DAC based on the second Bluetooth address. Further, the electronic device 201 may receive an FHS packet from the second external device 290. The electronic device 201 may identify information about the second external device 290 (e.g., the third Bluetooth address) using the FHS packet.

In operation 907, the electronic device 201 may identify whether the third Bluetooth address of the second external device 290 (e.g., the Bluetooth address of the second external device 290) included in the second data is included in the paired device list of the first external device 280 received from the first external device 280.

In operation 909, when the third Bluetooth address is included in the paired device list received from the first external device 280, the electronic device 201 may provide a user interface including the information about the second external device 290 and indicating that a connection request is received from the second external device 290. The electronic device 201 may receive an input about whether to connect to the second external device 290 through the user interface.

In operation 911, the electronic device 201 may determine whether to connect to the second external device 290 according to input (e.g., connection acceptance or connection rejection) performed on the user interface. For example, when connection acceptance input is received through the user interface, the electronic device 201 may establish a connection with the second external device 290 using Bluetooth communication. In one embodiment, when the third Bluetooth address is included in the paired device list, the electronic device 201 may immediately establish a connection (or attempt to connect) with the second external device 290. For example, when the third Bluetooth address is included in the paired device list, the electronic device 201 may establish a connection (or attempt to connect) with the second external device 290 without identifying whether a connection is established.

When the third Bluetooth address is not included in the paired device list, the electronic device 201 may not establish a connection with the second external device 290 in operation 913. For example, the electronic device 201 may ignore the connection request received from the second external device 290. In one embodiment, the electronic device 201 may not report that the connection request is received from the second external device 290.

Figure 10:
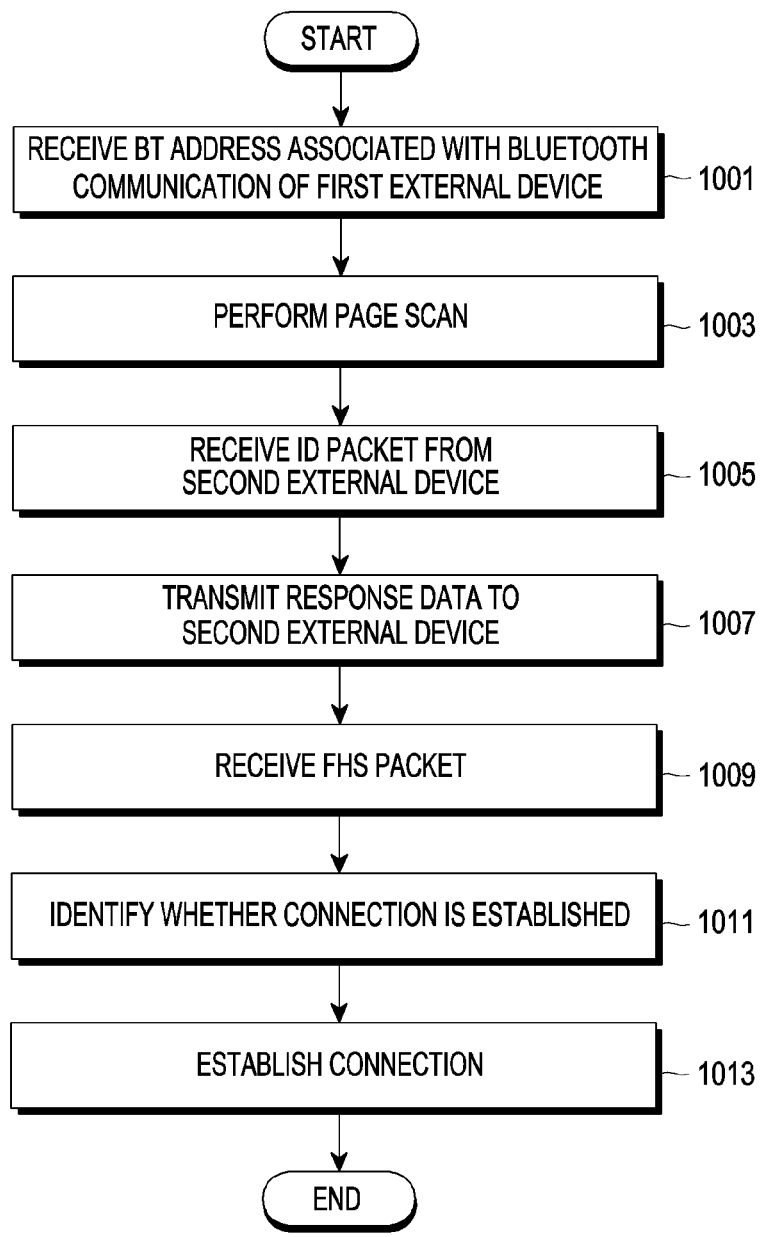
FIG. 10 is a flowchart illustrating a method in which an electronic device connects with a second external device according to various embodiments.

FIG. 10 is a flowchart illustrating a method in which an electronic device connects with a second external device according to various embodiments.

Referring to FIG. 10, in operation 1001, an electronic device (e.g., the electronic device 201 of FIG. 2) may receive first data associated with Bluetooth communication of a first external device (e.g., the first external device 280 of FIG. 2). For example, the first data may include a second Bluetooth address (e.g., the Bluetooth address of the first external device 280).

In operation 1003, the electronic device 201 may perform a page scan on the basis of the first Bluetooth address thereof and the second Bluetooth address included in the first data. According to one embodiment, the electronic device 201 may perform a page scan only on the basis of the second Bluetooth address.

In operation 1005, the electronic device 201 may receive second data from a second external device (e.g., the second external device 290 of FIG. 2) while performing the page scan. For example, the second data may be data for a connection request that the second external device 290 transmits to the first external device 280 and may be an ID packet including a DAC based on the second Bluetooth address.

In operation 1007, the electronic device 201 may transmit response data to the second external device 290 in response to the received ID packet.

In operation 1009, the electronic device 201 may receive an FHS packet from the second external device 290. The electronic device 201 may obtain information about the second external device 290 on the basis of the FHS packet.

In operation 1011, the electronic device 201 may provide a user interface based on the obtained information about the second external device 290 in order to identify whether the electronic device 201 is connected to the second external device 290. For example, the user interface may include the Bluetooth address of the second external device 290.

In operation 1013, the electronic device 201 may establish a connection (or pairing) with the second external device 290 using Bluetooth communication according to the identification result.

According to various embodiments, the first communication circuit 250 of the electronic device 201 may be configured as a controller specified in the Bluetooth standard, and the processor 220 of the electronic device 201 may be configured as a host specified in the Bluetooth standard.

Figure 11A:
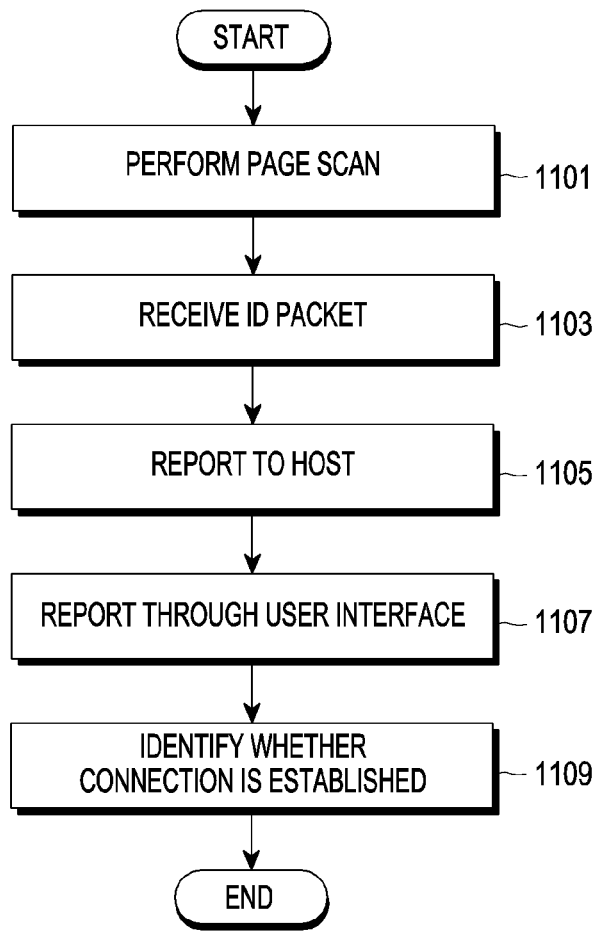
FIG. 11A is a flowchart illustrating the operation of a processor and a communication circuit of an electronic device for connecting with a second external device according to various embodiments.

FIG. 11A is a flowchart illustrating the operation of a processor and a communication circuit of an electronic device for connecting with a second external device according to various embodiments.

Referring to FIG. 11A, in operation 1101, an electronic device (e.g., the electronic device 201 of FIG. 2) may perform a page scan on the basis of a first Bluetooth address thereof and a second Bluetooth address (e.g., the Bluetooth address of the first external device 280). For example, the first communication circuit 250 of the electronic device 201 may perform a page scan on the basis of the first Bluetooth address and the second Bluetooth address. The electronic device 201 may obtain the second Bluetooth address and/or a paired device list of the first external device 280 from the first external device 280 or a server before performing the page scan.

In operation 1103, the electronic device 201 may receive an ID packet including a DAC based on the second Bluetooth address from a second external device (e.g., the second external device 290 of FIG. 2) while performing the page scan. For example, the first communication circuit 250 of the electronic device 201 may receive the ID packet from the second external device 290.

In operation 1105, the first communication circuit 250 may report a page scan result to the processor 220 (e.g., a host proposed in the Bluetooth standard). For example, the first communication circuit 250 may transmit the ID packet, received from the second external device 290, to the processor 220.

In operation 1107, the processor 220 may report that a connection request is received from the second external device 290 via a user interface on the basis of the ID packet. For example, the processor 220 may provide information about the second external device 290 via the user interface.

In operation 1109, the processor 220 may identify whether the electronic device 201 is connected with the second external device 290 via the user interface. For example, the processor 220 may identify whether the electronic device 201 is connected with the second external device 290 according to input (e.g., a connection acceptance or connection rejection input) performed on the user interface.

Figure 11B:
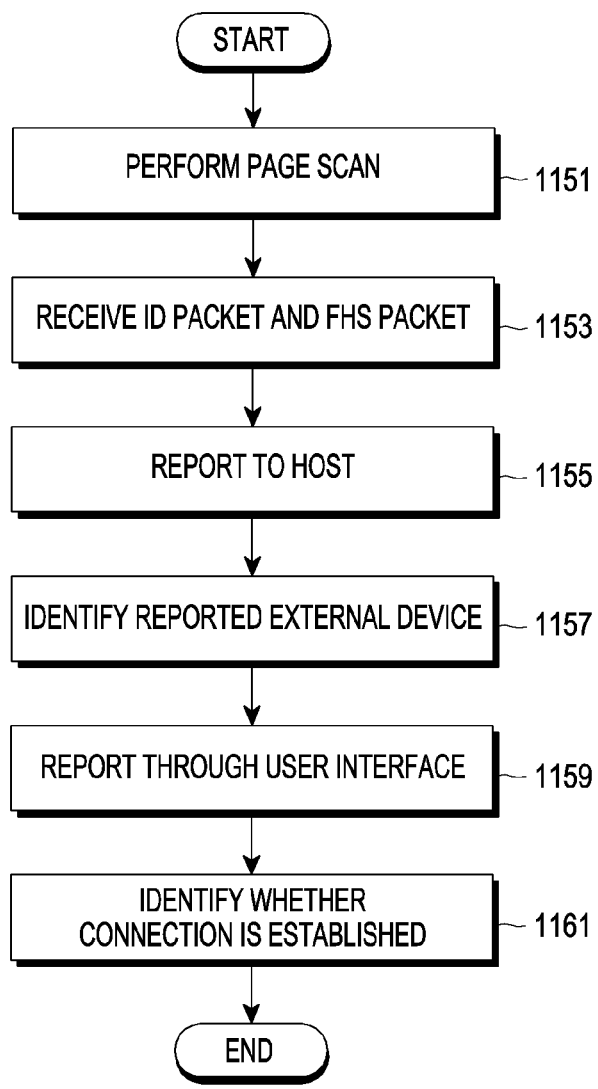
FIG. 11B is a flowchart illustrating the operation of a processor and a communication circuit of an electronic device for connecting with a second external device according to various embodiments.

FIG. 11B is a flowchart illustrating the operation of a processor and a communication circuit of an electronic device for connecting with a second external device according to various embodiments.

Referring to FIG. 11B, in operation 1151, an electronic device (e.g., the electronic device 201 of FIG. 2) may perform a page scan on the basis of a first Bluetooth address thereof and a second Bluetooth address (e.g., the Bluetooth address of the first external device 280). For example, the first communication circuit 250 of the electronic device 201 may perform a page scan on the basis of the first Bluetooth address and/or the second Bluetooth address. The electronic device 201 may obtain the second Bluetooth address and/or a paired device list of the first external device 280 from the first external device 280 or a server before performing the page scan.

In operation 1153, the electronic device 201 may receive an ID packet including a DAC based on the second Bluetooth address and an FHS packet from a second external device (e.g., the second external device 290 of FIG. 2) while performing the page scan. For example, the first communication circuit 250 of the electronic device 201 may receive the ID packet and the FHS packet from the second external device 290.

In operation 1155, the first communication circuit 250 may report a page scan result to the processor 220 (e.g., a host proposed in the Bluetooth standard). For example, upon receiving the ID packet from the second external device 290, the first communication circuit 250 may transmit the received ID packet to the processor 220. In another example, upon receiving the FHS packet from the second external device 290, the first communication circuit 250 may transmit the received FHS packet to the processor 220.

In operation 1157, the processor 220 may identify information about the second external device 290 on the basis of the FHS packet. The processor 220 may also identify whether the second external device 290 is a paired device that has been previously paired with the first external device 280. For example, the processor 220 may identify whether the Bluetooth address of the second external device 290 is included in the paired device list received from the first external device 280.

In operation 1159, the processor 220 may report that a connection request is received from the second external device 290 via a user interface according to an identification result. For example, the processor 220 may provide the information about the second external device 290 via the user interface.

In operation 1161, the processor 220 may identify whether the electronic device 201 is connected with the second external device 290 via the user interface. For example, the processor 220 may identify whether the electronic device 201 is connected with the second external device 290 according to input (e.g., a connection acceptance or connection rejection input) performed on the user interface.

Figure 12:
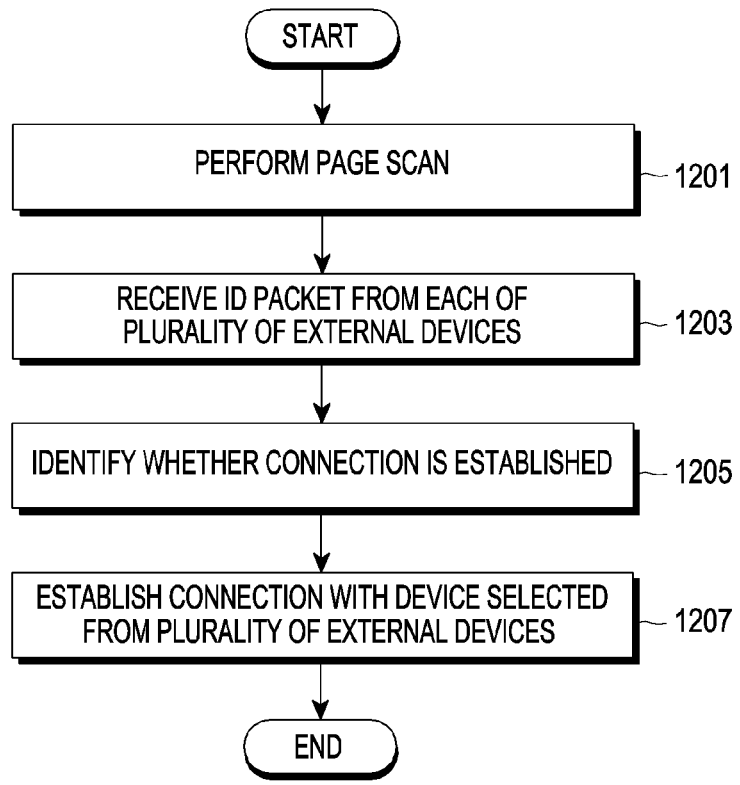
FIG. 12 is a flowchart illustrating an operation in which an electronic device establishes a connection with any one external device when receiving a connection request from a plurality of external devices according to various embodiments.

FIG. 12 is a flowchart illustrating an operation in which an electronic device establishes a connection with any one external device when receiving a connection request from a plurality of external devices according to various embodiments.

Referring to FIG. 12, in operation 1201, an electronic device (e.g., the electronic device 201 of FIG. 2) may perform a page scan on the basis of a first Bluetooth address and a second Bluetooth address (e.g., the Bluetooth address of the first external device 280). In one embodiment, the electronic device 201 may obtain the second Bluetooth address and/or a paired device list of the first external device 280 from the first external device 280 or a server before performing the page scan.

In operation 1203, the electronic device 201 may receive a connection request from a plurality of external devices while performing the page scan. For example, the electronic device 201 may receive an ID packet from each of the plurality of external devices. For example, the electronic device 201 may receive the ID packet including a DAC based on at least one of the first Bluetooth address and the second Bluetooth address from each of the plurality of external devices.

In operation 1205, the electronic device 201 may identify whether there is a connection established with the plurality of external devices requesting a connection. For example, the electronic device 201 may identify information about the plurality of external devices and may provide information about the plurality of external devices through a user interface. The electronic device 201 may report that the connection request is received from the plurality of external devices through the user interface. In addition, the electronic device 201 may provide information about selection of any one device to which the electronic device 201 desires to connect among the plurality of external devices through the user interface.

In operation 1207, the electronic device 201 may establish a connection with one external device selected from among the plurality of external devices through the user interface. One or more external devices may be selected. For example, the electronic device 201 may connect to a keyboard and a headset at the same time. Alternatively, the electronic device 201 may reject a connection with any of the plurality of external devices.

Figure 13A:
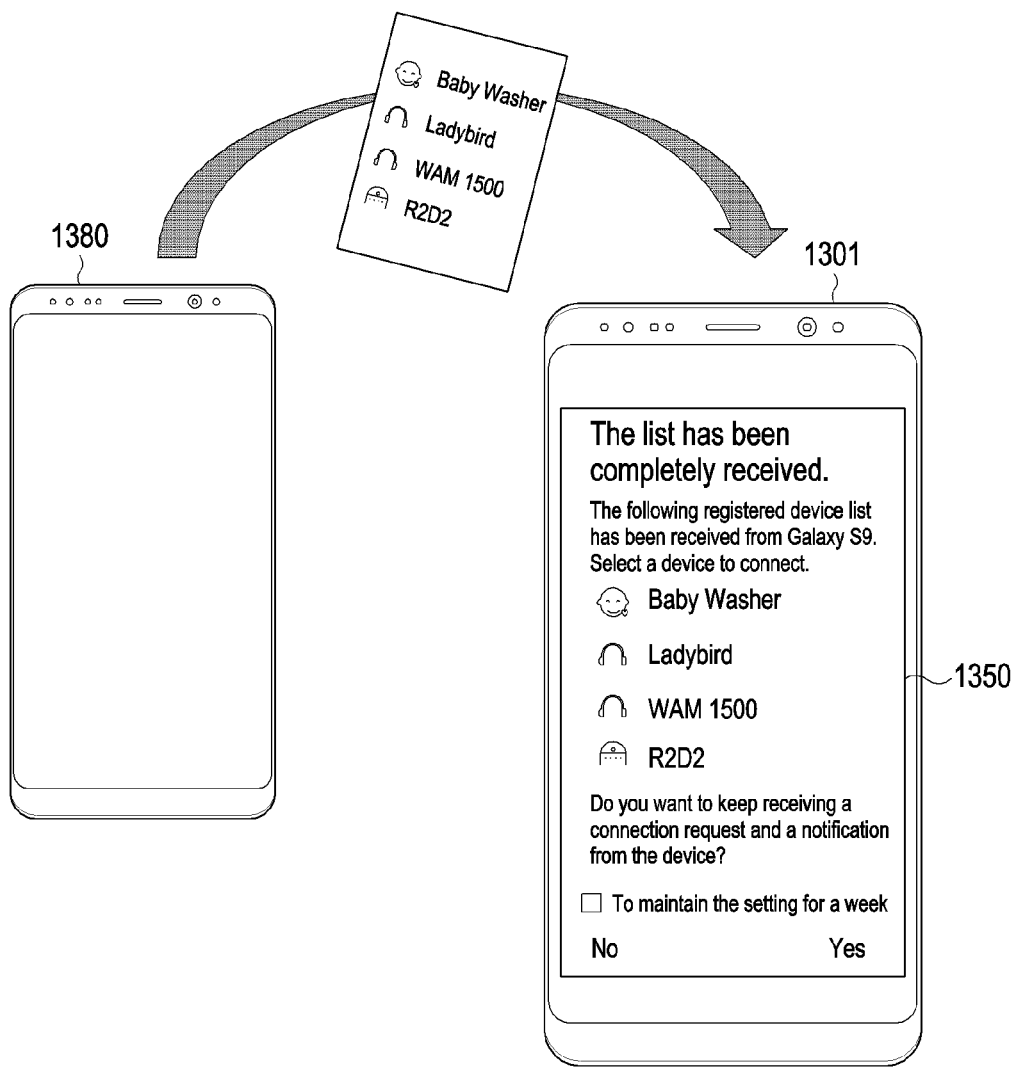
FIG. 13A illustrates an operation in which an electronic device shares a list according to various embodiments.
Figure 13B:
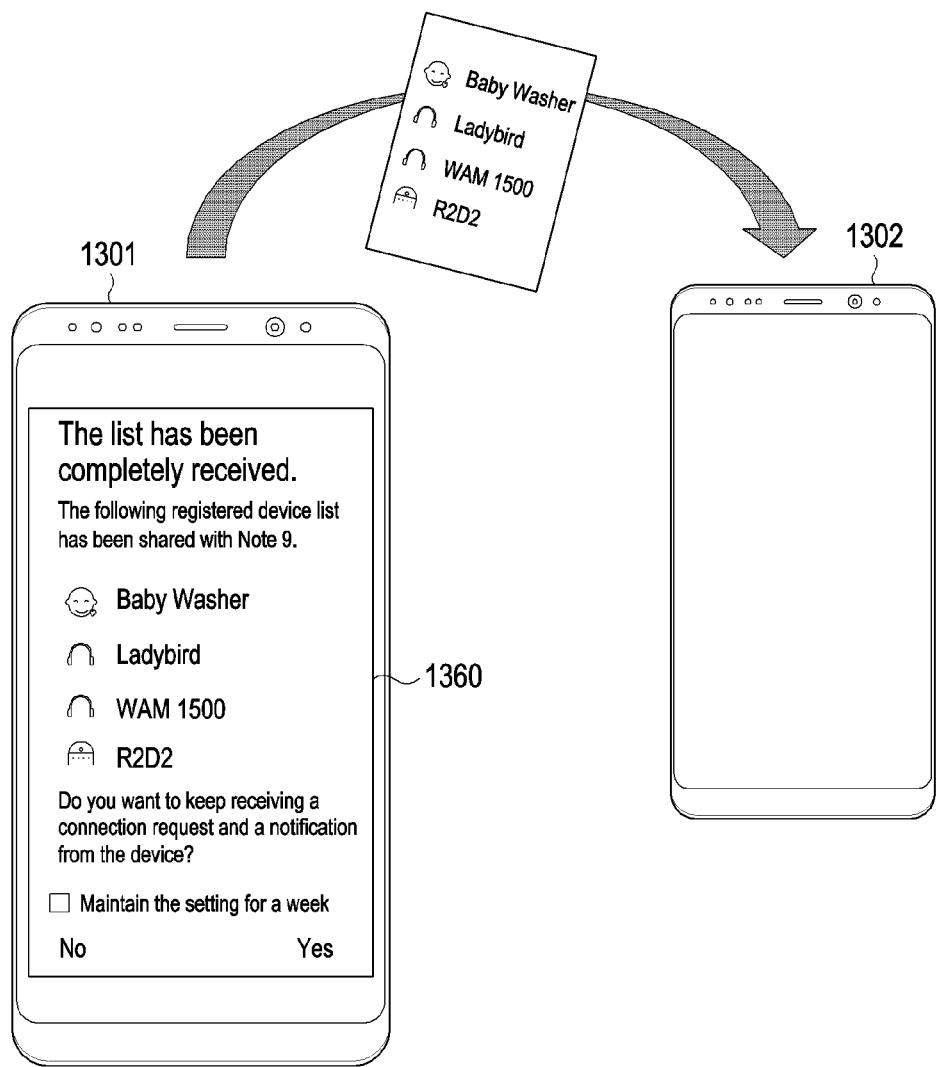
FIG. 13B illustrates an operation in which an electronic device shares a list according to various embodiments.

FIG. 13A illustrates an operation in which an electronic device shares a list according to various embodiments. FIG. 13B illustrates an operation in which an electronic device shares a list according to various embodiments.

Referring to FIGS. 13A and 13B, an electronic device 1301 may be configured to be substantially the same as or similar to the electronic device 201 of FIG. 2. A first external device 1380 may also be configured to be substantially the same as or similar to the first external device 280 of FIG. 2.

Referring to FIG. 13A, the electronic device 1301 may receive a paired device list of devices previously paired with the first external device 1380. For example, the electronic device 1301 may receive the paired device list directly from the first external device 1380, or may receive the paired device list from a server (or cloud server) or a different electronic device. In addition, the electronic device 1301 may receive the second Bluetooth address of the first external device 1380 along with the paired device list.

According to various embodiments, upon receiving the paired device list of the first external device 1380, the electronic device 1301 may provide information indicating that the paired device list is received via a user interface 1350. Here, the user interface 1350 may include information about the device names and/or the Bluetooth addresses of the paired devices previously connected (or paired) with the first external device 1380.

According to various embodiments, the electronic device 1301 may determine whether to use at least one Bluetooth address included in the paired device list on the basis of a user input. The electronic device 1301 may select an electronic device from which the user wants to receive a connection request from among at least one electronic device included in the paired device list. For example, the electronic device 1301 may select a plurality of electronic devices according to a user input. For example, the electronic device 1301 may perform a page scan using the first Bluetooth address, which is the unique Bluetooth address of the electronic device 1301, and a second Bluetooth address received from a first external electronic device. For example, the electronic device 1301 may perform a page scan using a plurality of addresses (e.g., the first Bluetooth address and the second Bluetooth address) according to a user input. Alternatively, the electronic device may perform a page scan using one address (e.g., the first Bluetooth address or the second Bluetooth address) according to a user input. Accordingly, the electronic device 1301 may receive a connection request only from the external device selected from among the at least one electronic device included in the paired device list according to the user input.

According to various embodiments, the electronic device 1301 may select an electronic device from which the user wants to receive a notification from among the at least one electronic device included in the paired device list according to a user input. For example, the electronic device 1301 may select a plurality of electronic devices according to a user input. Accordingly, the electronic device 1301 may receive a notification only from the electronic device selected according to the user input.

According to various embodiments, the electronic device 1301 may set a period for performing a page scan according to a user input. The electronic device 1301 may perform a page scan on the basis of the first Bluetooth address for a first time and may perform a page scan on the basis of the second Bluetooth address for a second time. For example, the electronic device 1301 may set a period for the first time and a period for the second time according to a user input. The electronic device 1301 may set the first time and the second time to the same period or different periods. The electronic device 1301 may receive a notification for a page scan through a user interface 1350 and may then receive an acknowledgment as to whether to receive the notification for the page scan from the user.

The electronic device 1301 may maintain setting information according to the user input for a specified period. The electronic device 1301 may provide information about the period for which the setting information according to the user input is to be maintained through the user interface. For example, the electronic device 1301 may display a check box including text "Maintain the setting for a week" through the user interface 1350, and may maintain the setting information for a week when the check box is checked. The electronic device 1301 may provide the user interface 1350 for a page scan after the elapsed of the specified period.

Referring to FIG. 13B, the electronic device 1301 may share a paired device list of the electronic device 1301 with a different external device 1302. For example, the electronic device 1301 may transmit the paired device list of the first external device 1380 to the different external device. In addition, the electronic device 1301 may transmit the paired device list of devices previously paired with the electronic device 1301 to the different external device. The electronic device 1301 may also transmit (or share) the first Bluetooth address of the electronic device 1301 along with the paired device list.

According to various embodiments, when the paired device list is transmitted to the different external device 1302, the electronic device 1301 may provide information indicating that the paired device list is shared through a user interface 1360. Here, the user interface 1360 may include device names and/or Bluetooth addresses of devices included in the paired device list shared with the different external devices 1302.

According to various embodiments, the electronic device 1301 may select an electronic device from which the user wants to receive a connection request and/or a notification from among at least one electronic device included in the paired device list according to a user input. For example, the electronic device 1301 may select a plurality of electronic devices according to a user input. Accordingly, the electronic device 1301 may be configured to receive a connection request and/or a notification only from the selected electronic device according to the user input, thereby sharing the paired device list. For example, the electronic device 1301 may maintain or reject the reception of a connection request and/or a notification from at least one device included in the paired device list shared with the different external device 1302.

Figure 14A:
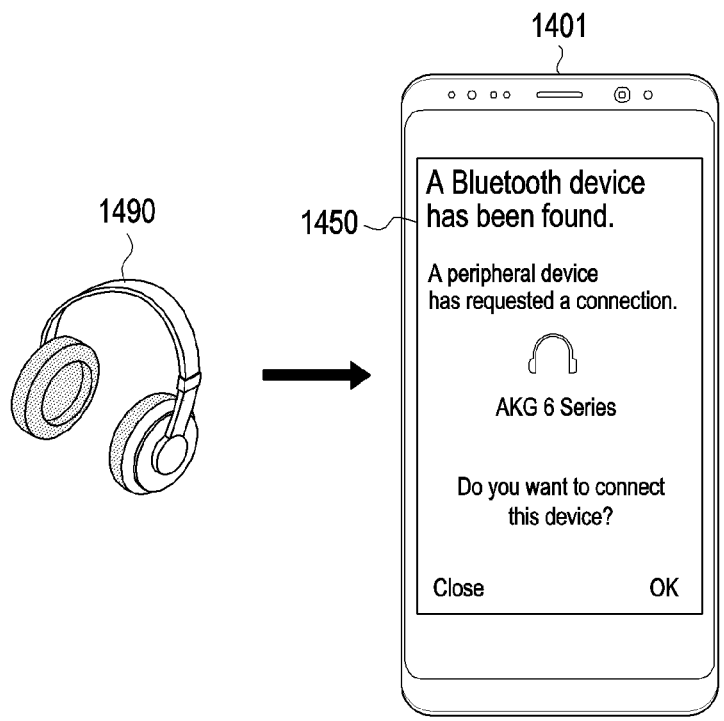
FIG. 14A illustrates an operation in which an electronic device establishes a connection with a second external device according to various embodiments.
Figure 14B:
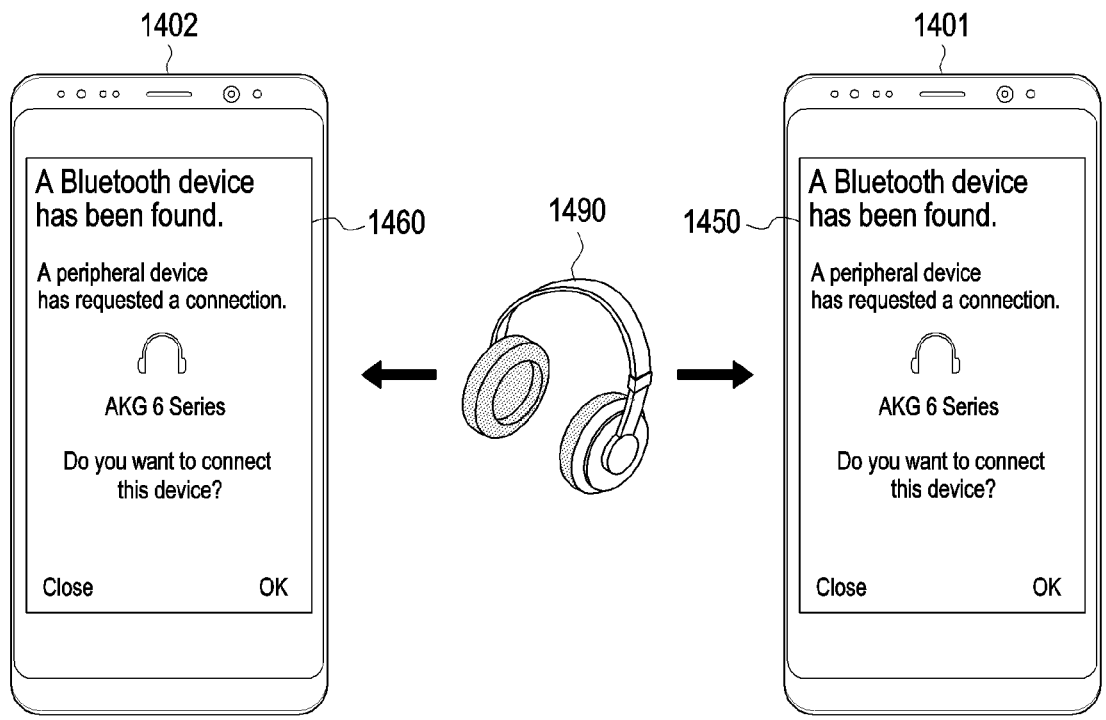
FIG. 14B illustrates an operation in which an electronic device establishes a connection with a second external device according to various embodiments.
Figure 14C:
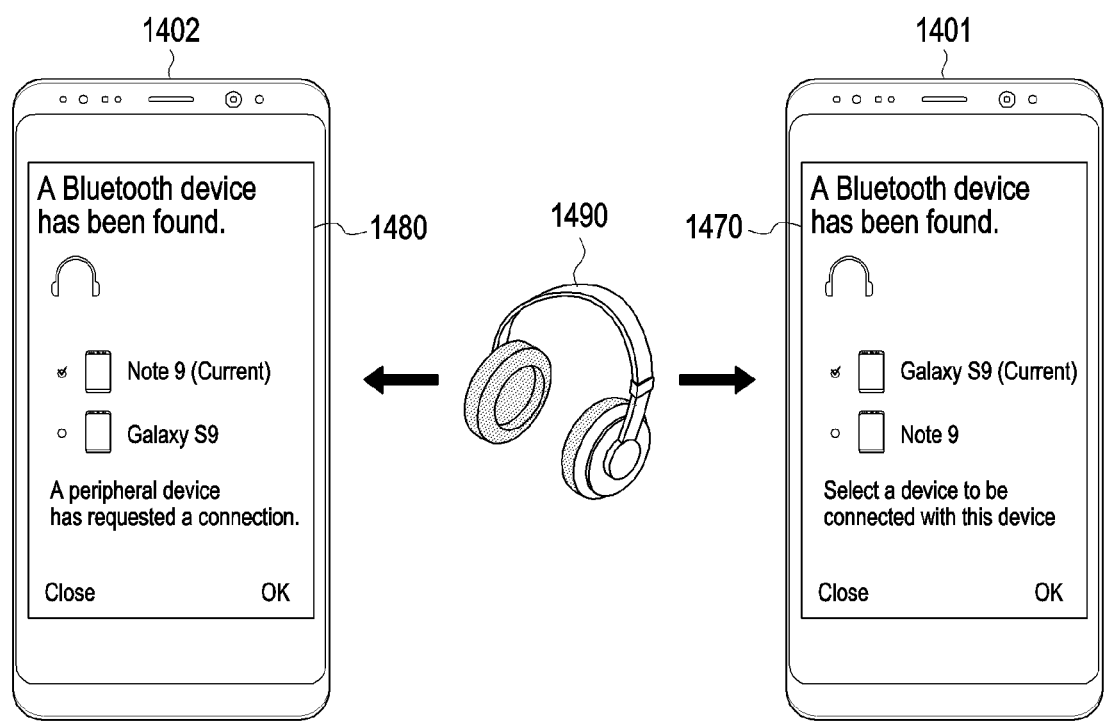
FIG. 14C illustrates an operation in which an electronic device establishes a connection with a second external device according to various embodiments.

FIG. 14A illustrates an operation in which an electronic device establishes a connection with a second external device according to various embodiments. FIG. 14B illustrates an operation in which an electronic device establishes a connection with a second external device according to various embodiments. FIG. 14C illustrates an operation in which an electronic device establishes a connection with a second external device according to various embodiments.

Referring to FIGS. 14A to 14C, an electronic device 1401 may be configured to be substantially the same as or similar to the electronic device 201 of FIG. 2. A second external device 1490 may also be configured to be substantially the same as or similar to the second external device 290 of FIG. 2.

Referring to FIG. 14A, the electronic device 1401 may receive a connection request from the second external device 1490.

According to various embodiments, FIG. 14A shows the case in which there is no different electronic device (e.g., the first external device 280) previously connected (or paired) with the second external device 1490 around the electronic device 1401 or in which a different electronic device has suspended a page scan.

According to various embodiments, when the electronic device 1401 receives the connection request from the second external device 1490, the electronic device 1401 may display a user interface 1450 via a display (e.g., the display 260 of FIG. 2).

According to various embodiments, the electronic device 1401 may provide information (e.g., a device name and/or a Bluetooth address) about the second external device 1490 via the user interface 1450. In addition, the electronic device 1401 may request the user to identify whether to connect with the second external device 1490 via the user interface 1450. The electronic device 1401 may perform an operation of connecting with the second external device 1490 when a connection acceptance input is received.

According to various embodiments, when the electronic device 1401 obtains a paired device list, the electronic device 1401 may provide information about the device name (or device name and Bluetooth address) of the second external device 1490 via the user interface 1450. Alternatively, when the electronic device 1401 fails to obtain the paired device list, the electronic device 1401 may provide only information about the Bluetooth address of the second external device 1490 via the user interface 1450.

Referring to FIG. 14B, the electronic device 1401 may receive a connection request from the second external device 1490. Here, a different electronic device 1402 (e.g., the first external device 280) may also receive the connection request from the second external device 1490.

According to various embodiments, the electronic device 1401 and the different electronic device 1402 may perform a page scan using the same Bluetooth address of the different electronic device 1402. The electronic device 1401 and the different electronic device 1402 may receive the connection request (e.g., an ID packet) based on the same Bluetooth address of the different electronic device 1402 from the second external device 1490.

According to various embodiments, upon receiving the connection request from the second external device 1490, the electronic device 1401 and the different electronic device 1402 may display the user interfaces 1450 and 1460, respectively, via the display.

According to various embodiments, each of the electronic device 1401 and the different electronic devices 1402 may make a request to identify whether to connect with the second external device 1490 via the user interfaces 1450 and 1460. For example, the second external device 1490 may be connected to the electronic device that identifies the connection acceptance input first among the electronic device 1401 and the different electronic device 1402. Further, the electronic device that identifies a connection acceptance input later or never identifies a connection acceptance input cannot be connected with the second external device 1490, and information indicating that a connection cannot be established may be provided through the user interface.

Referring to FIG. 14C, the electronic device 1401 may receive a connection request from the second external device 1490. Here, the different electronic device 1402 may also receive the connection request from the second external device 1490.

According to various embodiments, the different electronic device 1402 may be the first external device 280 illustrated above in FIG. 2. The electronic device 1401 may receive information about Bluetooth communication of the different electronic device 1402, thus identifying information about the different electronic device 1402.

According to various embodiments, the electronic device 1401 may select the device to connect with the second external device 1490 from among the electronic device 1401 and the different electronic device 1402, both of which receive the connection request. For example, the electronic device 1401 may provide information about the second external device 1490 transmitting the connection request and information about the different electronic device 1402 through a user interface 1470. In addition, the electronic device 1401 may provide information for selecting a device to connect with the second external device 1490 among the electronic device 1401 and the different electronic device 1402.

According to various embodiments, the different electronic device 1402 may also select a device to connect with the second external device 1490 among the electronic device 1401 and the different electronic device 1402 which receive the connection request. For example, the different electronic device 1402 may provide the information about the second external device 1490 transmitting the connection request and information about the electronic device 1401 through a user interface 1480. In addition, the different electronic device 1402 may provide information for selecting a device to connect with the second external device 1490 among the electronic device 1401 and the different electronic device 1402.

According to various embodiments, when receiving a connection acceptance input or connection rejection input, the electronic device 1401 may transmit information about connection acceptance or connection rejection to the different electronic device 1402. Here, the electronic device 1401 and the different electronic device 1402 may share device information thereof with each other in advance.

Figure 15A:
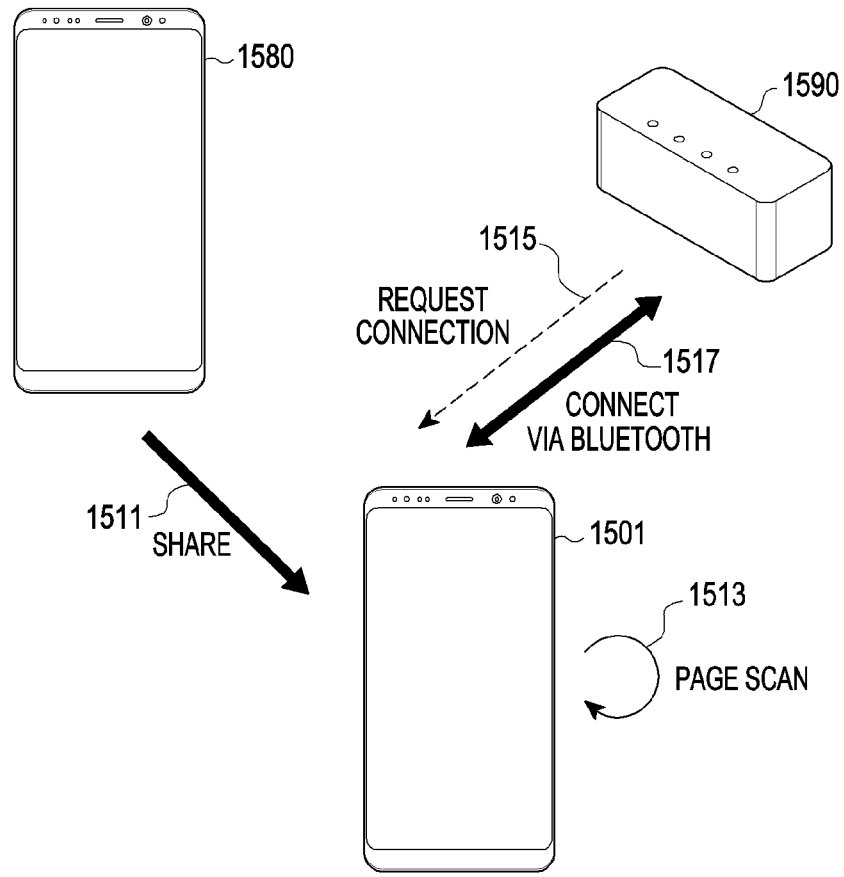
FIG. 15A illustrates an operation in which an electronic device establishes a connection with a second external device according to various embodiments.
Figure 15B:
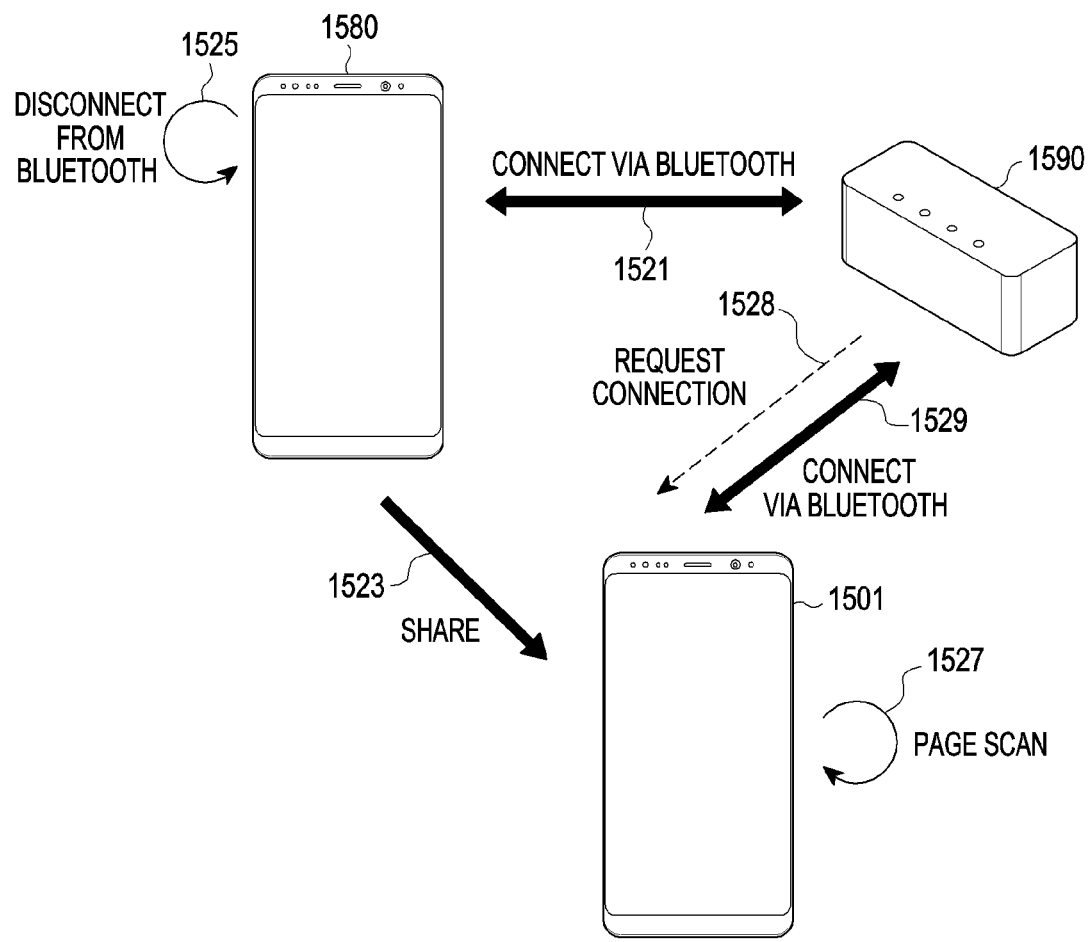
FIG. 15B illustrates an operation in which an electronic device establishes a connection with a second external device according to various embodiments.
Figure 15C:
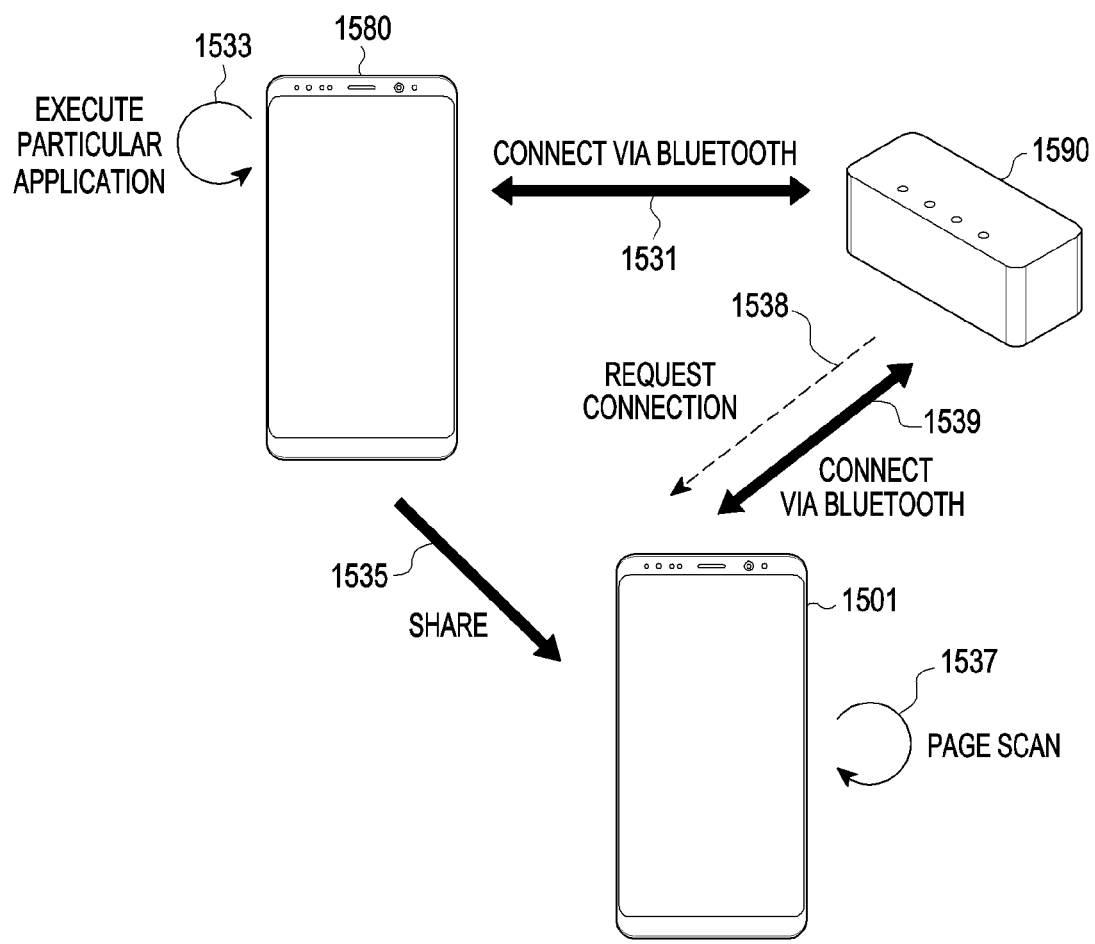
FIG. 15C illustrates an operation in which an electronic device establishes a connection with a second external device according to various embodiments.
Figure 15D:
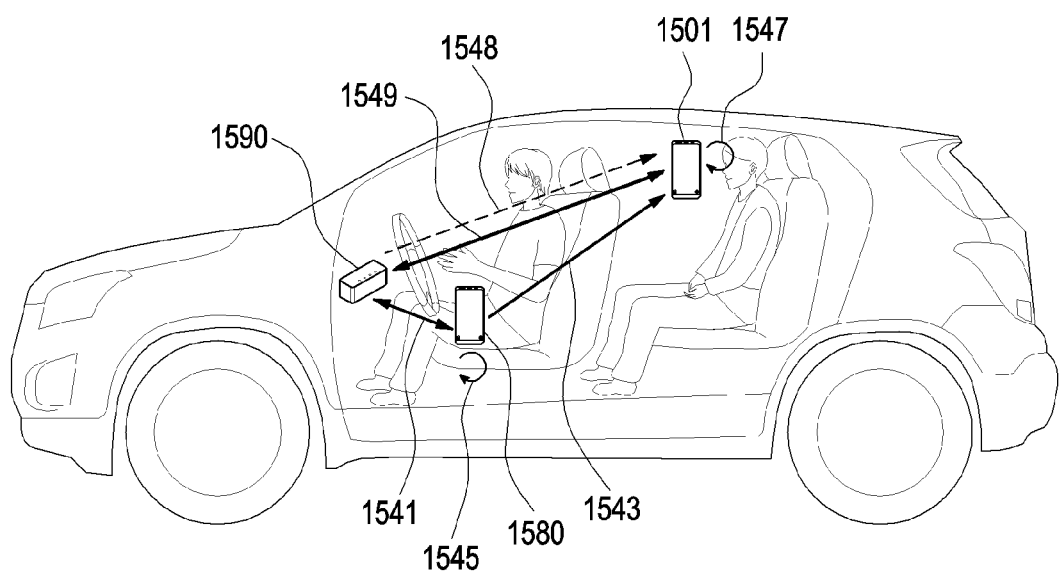
FIG. 15D illustrates an operation in which an electronic device establishes a connection with a second external device according to various embodiments.

FIG. 15A illustrates an operation in which an electronic device establishes a connection with a second external device according to various embodiments. FIG. 15B illustrates an operation in which an electronic device establishes a connection with a second external device according to various embodiments. FIG. 15C illustrates an operation in which an electronic device establishes a connection with a second external device according to various embodiments. FIG. 15D illustrates an operation in which an electronic device establishes a connection with a second external device according to various embodiments.

Referring to FIGS. 15A to 15D, an electronic device 1501 may be configured to be substantially the same as or similar to the electronic device 201 of FIG. 2. A first external device 1580 and a second external device 1590 may also be configured to be substantially the same as or similar to the first external device 280 and the second external device 290 of FIG. 2.

Referring to FIG. 15A, in operation 1511, the electronic device 1501 (e.g., a new smartphone) receives shared information about Bluetooth communication (e.g., a second Bluetooth address and/or a paired device list) of the first external device 1580 (e.g., a previously used smartphone).

According to various embodiments, in operation 1513, the electronic device 1501 according to one embodiment may perform a page scan on the basis of a first Bluetooth address and the second Bluetooth address. The electronic device 1501 according to another embodiment may perform a page scan on the basis of the second Bluetooth address. Here, the first external device 1580 may not perform a page scan, or may not be located around the electronic device 1501. In operation 1515, the electronic device 1501 may receive a connection request based on the second Bluetooth address from the second external device 1590 (e.g., a device previously paired with the first external device 1580) while performing the page scan based on the second Bluetooth address. In operation 1517, the electronic device 1501 may be connected with the second external device 1590 on the basis of the received connection request. The electronic device 1501 may be connected with the second external device 1590 using Bluetooth communication without a separate new connection process.

Referring to FIG. 15B, in operation 1521, the first external device 1580 may be connected (or paired) with the second external device 1590 using Bluetooth communication. In operation 1523, the electronic device 1501 (e.g., a new smartphone) may receive shared information about Bluetooth communication (e.g., a second Bluetooth address and/or a paired device list) of the first external device 1580 (e.g., a previously used smartphone).

According to various embodiments, in operation 1525, the first external device 1580 may be disconnected from the second external device 1590. In operation 1527, the electronic device 1501 according to one embodiment may perform a page scan on the basis of the first Bluetooth address and the second Bluetooth address. The electronic device 1501 according to another embodiment may perform a page scan on the basis of the second Bluetooth address. Here, the first external device 1580 may not perform a page scan. In operation 1528, the electronic device 1501 may receive a connection request based on the second Bluetooth address from the second external device 1590 while performing the page scan based on the second Bluetooth address. In operation 1529, the electronic device 1501 may be connected with the second external device 1590 on the basis of the received connection request. When a user uses various types of electronic devices (e.g., 1501 and 1580), the electronic device 1501 may connect to the second external device 1590 using Bluetooth communication without a separate new connection process.

Referring to FIG. 15C, in operation 1531, the first external device 1580 may be connected (paired) with the second external device 1590 using Bluetooth communication. The first external device 1580 may execute a particular application in operation 1533. When the particular application is executed, the first external device 1580 may share information about Bluetooth communication (e.g., a second Bluetooth address and/or a paired device list) of the first external device 1580 (e.g., a previously used smartphone) with the electronic device 1501 (e.g., a new smartphone) in operation 1535. For example, the particular application may be a data backup application. The first external device 1580 may be disconnected from the second external device 1590 after the data backup application is executed. Here, the first external device 1580 may not perform a page scan.

According to various embodiments, the electronic device 1501 may receive the information about the Bluetooth communication of the first external device 1580 shared by the first external device 1580. The electronic device 1501 according to one embodiment may perform a page scan on the basis of the first Bluetooth address and the second Bluetooth address in operation 1537. The electronic device 1501 according to another embodiment may perform a page scan on the basis of the second Bluetooth address. In operation 1538, the electronic device 1501 may receive a connection request based on the second Bluetooth address from the second external device 1590 while performing the page scan based on the second Bluetooth address. In operation 1539, the electronic device 1501 may connect to the second external device 1590 on the basis of the received connection request. For example, when the data backup application is executed in the first external device 1580, the electronic device 1501 may connect to the second external device 1590 using Bluetooth communication without a separate new connection process.

Referring to FIG. 15D, the electronic device 1501 (e.g., a new smartphone) may be connected (paired) with the second external device 1590 as the first external device 1580 (e.g., a previously used smartphone) is disconnected from the second external device 1590 (e.g., an in-vehicle entertainment system). In operation 1541, the first external device 1580 may be connected (paired) with the second external device 1590. In operation 1543, the electronic device 1501 may receive the shared information about Bluetooth communication (e.g., a second Bluetooth address and/or a paired device list) of the first external device 1580.

According to various embodiments, in operation 1545, the first external device 1580 may be disconnected from the second external device 1590 when a specified condition is satisfied in the first external device 1580. Here, the first external device 1580 may not perform a page scan. For example, the specified condition may be the execution of a particular application (e.g., a data backup application or a vehicle mode application), a request of an electronic device (e.g., the electronic device 1501), or a change in hardware settings of the first external device 1580 (e.g., a decrease in battery level).

In operation 1547, after a particular application (e.g., a data backup application) is executed in the first external device 1580, the electronic device 1501 may perform a page scan on the basis of the first Bluetooth address and the second Bluetooth address. In operation 1548, the electronic device 1501 may receive a connection request based on the second Bluetooth address from the second external device 1590 while performing the page scan based on the second Bluetooth address. In operation 1549, the electronic device 1501 may connect to the second external device 1590 on the basis of the received connection request. For example, when the data backup application is executed in the first external device 1580 of a first rider (e.g., a driver), the electronic device 1501 of a second rider (e.g., a passenger) may connect to the second external device 1590 using Bluetooth communication without a separate new connection process. For example, when a music playback function, which is executed in the electronic device 1501, is implemented, a sound may be output through the second external device 1590. According to various embodiments, when a specified condition is satisfied in the electronic device 1501, the electronic device 1501 may request the first external device 1580 to share information about a Bluetooth connection established with the first external device 1580. For example, the specified condition may be the execution of a particular application (e.g., a backup application or a vehicle mode application) or a change in hardware settings of the electronic device 1501 (e.g., an increase in battery level). When the electronic device 1501 makes a request to share the information about the Bluetooth connection, the first external device 1580 may be disconnected from the second external device 1590 connected via Bluetooth, may transmit Bluetooth information about the first external device 1580 to the electronic device 1501, and may suspend a page scan.

An electronic device 201 according to various embodiments may include: a display 260; a first wireless communication circuit 250 configured to support Bluetooth (BT)

communication and to include a first BT address; a processor 220 configured to be operatively connected to the display and the first wireless communication circuit 250; and a memory 230 configured to be operatively connected to the processor 220, wherein the memory 230 may store instructions that, when executed, cause the processor 220 to: receive first data including a second BT address associated with a first external device 280; perform a page scan on the basis of the first BT address and the second BT address using the BT communication; receive second data based on the second BT address from a second external device 290 using the BT communication; identify information for connection with the second external device 290 on the basis of the second data using the BT communication; and provide a user interface for connection with the second external device 290 through the display 260 on the basis of the identified information.

The second data may include an ID packet based on the second BT address of the first external device 280.

The instructions may cause the processor 220 to receive a frequency hop synchronization (FHS) packet from the second external device 290 and identify a third BT address of the second external device 290 included in the FHS packet.

The instructions may cause the processor 220 to provide information about the second external device 290 through the user interface on the basis of the FHS packet.

The instructions may cause the processor 220 to establish a connection with the second external device 290 using the BT communication in response to input received via the user interface.

The first data further includes information about a list (e.g., a paired device list) of at least one external device that has been paired with the first external device 280.

The instructions may cause the processor to receive the first data through the first external device 280 or a server.

An electronic device 201 according to various embodiments may include: a display 260; a first wireless communication circuit 250 configured to support Bluetooth (BT) communication and to include a first BT address; a processor 220 configured to be operatively connected to the display 260 and the first wireless communication circuit 250; and a memory 230 configured to be operatively connected to the processor 220, wherein the memory 230 may store instructions that, when executed, cause the processor 220 to: receive first data including a second BT address associated with BT communication of a first external device 280 and connection information; perform a page scan on the basis of the first BT address and the second BT address using the BT communication; receive second data based on the second BT address from a second external device 290 using the BT communication; transmit response data to the second external device 290 on the basis of the second BT address using the BT communication in response to reception of the second data; receive a frequency hop synchronization (FHS) packet from the second external device 290 using the BT communication; identify a third BT address of the second external device 290 included in the FHS packet; identify whether the third BT address is included in the connection information included in the first data; and provide a user interface for connection with the second external device 290 through the display 260 on the basis of the identification result.

The first data may further include a BT address and a device name of at least one external device that has been paired with the first external device 280.

The electronic device 201 may further include a second wireless communication circuit 270 configured to support at least one of Wi-Fi and cellular network communication, wherein the instructions may cause the processor 220 to receive the first data using the second wireless communication circuit 270.

The instructions may cause the processor 220 to provide information about the second external device 290 through the user interface on the basis of the FHS packet.

The instructions may cause the processor 220 to identify whether there is a connection established with the second external device 290 through the user interface when the third BT address is included in the connection information.

The instructions may cause the processor 220 to establish a connection with the second external device 290 using the BT communication in response to input received via the user interface.

The instructions may cause the processor 220 not to provide information for connection to the second external device 290 when the third BT address is not included in the connection information.

The second data may include an ID packet based on the second BT address of the first external device 280.

An electronic device 201 according to various embodiments may include: a first wireless communication circuit 250 configured to support Bluetooth (BT) communication using a first BT address; a processor 220; and a memory 230, wherein the memory 230 may store instructions that, when executed, cause the processor 220 to: obtain first data associated with BT communication of a first external device 280; perform a page scan on the basis of the first BT address and a second BT address of the first external device 280 included in the first data through the first wireless communication circuit 250; receive second data based on the second BT address from a second external device 290 through the first wireless communication circuit 250; identify information for connection with the second external device 290 on the basis of the second data; and establish a connection with the second external device 290 using the first wireless communication circuit 250 on the basis of the identification result.

The instructions may cause the processor 220 to provide a user interface for identifying information for connection with the second external device 290.

The first data may include a BT address of the first external device 280 and information about at least one external device (e.g., a paired device) previously paired with the first external device 280 using the BT communication.

The instructions may cause the processor 220 to perform a page scan on the basis of the first BT address for a first time and to perform a page scan on the basis of the second BT address for a second time.

An electronic device according to various embodiments may include: a Bluetooth (BT) communication circuit configured to perform wireless communication with at least one external device and to include a first BT address; a processor; and a memory configured to be operatively connected to the processor and to store a second BT address associated with BT communication of a first external device, wherein the BT communication circuit may be configured to receive the second BT address from the processor, to perform a page scan on a second external device using the first BT address and the second BT address, and to provide a result of the page scan based on the first BT address and the second BT address to the processor.

Each of the components of the electronic device according to the disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Also, some of the hardware components according to various embodiments may be combined into one entity, which may perform functions identical to those of the relevant components before the combination.

The embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   a wireless communication circuit configured to support Bluetooth (BT) communication using a first BT address;
   a processor configured to be operatively connected to the display and the wireless communication circuit; and
   a memory configured to be operatively connected to the processor and storing instructions that, when executed by the processor, cause the processor to:
   control the wireless communication circuit to receive, from a first external device, first data comprising a second BT address of the first external device, wherein the second BT address is a BT address of the first external device;
   perform, using the BT communication, a page scan based on the first BT address at a first time period and the second BT address at a second time period different from the first time period;
   receive, from a second external device, second data based on the page scan of the second BT address, wherein the second data is received from the second external device using the BT communication;
   identify information for connection with the second external device based on the second data using the BT communication; and
   display, on the display, a user interface for connection with the second external device using the first BT address based on the identified information.

2. The electronic device of claim 1, wherein the second data comprises an ID packet based on the second BT address of the first external device.

3. The electronic device of claim 1, wherein the memory stores instructions that, when executed by the processor, cause the processor to:
   control the wireless communication circuit to receive a frequency hop synchronization (FHS) packet from the second external device; and
   identify a third BT address of the second external device comprised in the FHS packet.

4. The electronic device of claim 3, wherein the memory stores instructions that, when executed by the processor, cause the processor to provide information about the second external device through the user interface based on the FHS packet.

5. The electronic device of claim 1, wherein the memory stores instructions that, when executed by the processor, cause the processor to establish a connection with the second external device using the first BT address in response to an input performed via the user interface.

6. The electronic device of claim 1, wherein the first data further comprises information about a list of at least one external device that has been paired with the first external device.

7. The electronic device of claim 1, wherein the memory stores instructions that, when executed by the processor, cause the processor to receive the first data through the first external device or a server.

8. An electronic device comprising:
   a display;
   a first wireless communication circuit configured to support Bluetooth (BT) communication using a first BT address;
   a processor configured to be operatively connected to the display and the first wireless communication circuit; and
   a memory configured to be operatively connected to the processor and storing instructions that, when executed by the processor, cause the processor to:
   control the first wireless communication circuit to receive, from a first external device, first data comprising a second BT address of the first external device and connection information, wherein the second BT address is a BT address of the first external device;
   perform, using the BT communication, a page scan based on the first BT address at a first time period and the second BT address at a second time period different from the first time period;
   receive, from a second external device, second data based on the page scan of the second BT address, wherein the second data is received from the second external device using the BT communication;
   transmit response data to the second external device based on the second BT address in response to reception of the second data;
   receive a frequency hop synchronization (FHS) packet from the second external device using the BT communication;
   identify a third BT address of the second external device comprised in the FHS packet;
   identify whether the third BT address is comprised in the connection information included in the first data; and
   display, on the display, a user interface for connection with the second external device using the first BT address based on an identification result.

9. The electronic device of claim 8, wherein the first data further comprises a BT address and a device name of at least one external device that has been paired with the first external device.

10. The electronic device of claim 8, further comprising a second wireless communication circuit configured to support at least one of Wi-Fi or cellular network communication,
   wherein the memory stores instructions that, when executed by the processor, cause the processor to receive the first data using the second wireless communication circuit.

11. The electronic device of claim 8, wherein the memory stores instructions that, when executed by the processor, cause the processor to provide information about the second external device through the user interface based on the FHS packet.

12. The electronic device of claim 8, wherein the memory stores instructions that, when executed by the processor, cause the processor to identify whether there is a connection established with the second external device through the user interface based on the third BT address being included in the connection information.

13. The electronic device of claim 12, wherein the memory stores instructions that, when executed by the processor, cause the processor to establish a connection with the second external device using the first BT address in response to an input performed via the user interface.

14. The electronic device of claim 8, wherein the memory stores instructions that, when executed by the processor, cause the processor to refrain from providing information for connection to the second external device based on the third BT address not being included in the connection information.

15. The electronic device of claim 8, wherein the second data comprises an ID packet based on the second BT address of the first external device.

16. An electronic device comprising:
a first wireless communication circuit configured to support Bluetooth (BT) communication using a first BT address;
a processor; and
a memory, storing instructions that, when executed by the processor, cause the processor to:
obtain first data comprising a second BT address of a first external device, wherein the second BT address is a BT address of the first external device;
perform, through the first wireless communication circuit, a page scan based on the first BT address at a first time period and the second BT address at a second time period different from the first time period;
receive, from a second external device, second data based on the page scan of the second BT address, wherein the second data is received from the second external device through the first wireless communication circuit;
identify information for connection with the second external device based on the second data; and
establish a connection with the second external device using the first BT address based on an identification result.

17. The electronic device of claim 16, wherein the memory stores instructions that, when executed by the processor, cause the processor to provide a user interface for identifying information for connection with the second external device.

18. The electronic device of claim 16, wherein the first data comprises information about at least one external device previously paired with the first external device using the BT communication.

19. The electronic device of claim 16, wherein the memory stores instructions that, when executed by the processor, cause the processor to perform a page scan based on the first BT address for a first time and to perform a page scan based on the second BT address for a second time.

20. An electronic device comprising:
a Bluetooth (BT) communication circuit configured to perform wireless communication with at least one external device using a first BT address;
a processor configured to be operatively connected to the BT communication circuit; and
a memory configured to be operatively connected to the processor and to store a second BT address of a first external device,
wherein the BT communication circuit is configured to:
receive the second BT address from the processor, wherein the second BT address is a BT address of the first external device;
perform, using the second BT address, a page scan on the first BT address at a first time period and a second external device at a second time period different from the first time period; and
provide a result of the page scan based on the second BT address to the processor.

* * * * *